(12) United States Patent
Margolis

(10) Patent No.: US 10,378,510 B2
(45) Date of Patent: Aug. 13, 2019

(54) VERTICAL AXIS WIND TURBINE WITH SELF-ORIENTATING BLADES

(71) Applicant: Alexander Margolis, Karmiel (IL)

(72) Inventor: Alexander Margolis, Karmiel (IL)

( * ) Notice: Subject to any disclaimer, the term of this patent is extended or adjusted under 35 U.S.C. 154(b) by 383 days.

(21) Appl. No.: 15/306,282

(22) PCT Filed: Apr. 12, 2015

(86) PCT No.: PCT/IL2015/050387
§ 371 (c)(1),
(2) Date: Oct. 24, 2016

(87) PCT Pub. No.: WO2015/166477
PCT Pub. Date: Nov. 5, 2015

(65) Prior Publication Data
US 2017/0045033 A1 Feb. 16, 2017

(30) Foreign Application Priority Data
Apr. 28, 2014 (IL) .......................................... 232303

(51) Int. Cl.
*F03D 3/06* (2006.01)
*F03D 3/00* (2006.01)

(52) U.S. Cl.
CPC ............. *F03D 3/061* (2013.01); *F03D 3/005* (2013.01); *F03D 3/068* (2013.01);
(Continued)

(58) Field of Classification Search
CPC .... F03D 3/005; F03D 3/068; F05D 2240/214; F05D 2250/02; F05D 2250/184; F05D 2250/312; F05D 2250/611
See application file for complete search history.

(56) References Cited

U.S. PATENT DOCUMENTS

| 485,933 A | * | 11/1892 | Herman | ......................... 416/119 |
| 1,534,635 A | * | 4/1925 | Correll | ...................... G09F 7/22 |
| | | | | 40/479 |

(Continued)

FOREIGN PATENT DOCUMENTS

| EP | 2594784 A2 | 5/2013 |
| FR | 2874063 A1 | 2/2006 |

(Continued)

OTHER PUBLICATIONS

ISR of PCT/IL2015/050387, dated Jul. 22, 2015.
Written Opinion of PCT/IL2015/050387, dated Jul. 22, 2015.

*Primary Examiner* — Ninh H. Nguyen
(74) *Attorney, Agent, or Firm* — Jeffri A. Kaminski; Venable LLP

(57) ABSTRACT

The invention is a wind turbine that is part of a system for utilizing the energy of wind to produce electrical energy. The turbine is a vertical axis wind turbine that is characterized by the design of its blades. The blades are shaped and attached to the turbine in a way that allows them to self-adjust their orientation with respect to the direction in which the wind is blowing. In this way the torque that each blade exerts on the turbine consist of two portions. When the blade is on the windward side of the turbine, it exerts on the turbine torque from the drag force. When the blade is on the leeward side of the turbine, the torque that the blade exerts on the turbine is from lift force.

10 Claims, 29 Drawing Sheets

(52) U.S. Cl.
CPC ... *F05B 2240/214* (2013.01); *F05B 2240/301* (2013.01); *F05B 2250/184* (2013.01); *F05B 2280/5001* (2013.01); *F05B 2280/6003* (2013.01); *F05D 2250/312* (2013.01); *F05D 2250/90* (2013.01); *Y02E 10/74* (2013.01)

(56) References Cited

U.S. PATENT DOCUMENTS

| | | | |
|---|---|---|---|
| 4,218,183 A * | 8/1980 | Dall-Winther | F03D 3/067 416/119 |
| 4,286,922 A | 9/1981 | Lew | |
| 4,383,801 A * | 5/1983 | Pryor | F03D 3/068 416/119 |
| 5,193,978 A | 3/1993 | Gutierrez | |
| 5,844,323 A * | 12/1998 | Hung | F03B 17/067 290/54 |
| 6,688,842 B2 * | 2/2004 | Boatner | F03D 3/067 415/4.2 |
| 6,926,491 B2 * | 8/2005 | Migler | F03D 3/067 415/4.4 |
| 7,385,302 B2 | 6/2008 | Jonsson | |
| 7,393,177 B2 | 7/2008 | Rahai et al. | |
| 8,011,876 B2 * | 9/2011 | Gradwohl | F03D 3/0481 415/4.2 |
| 8,496,433 B2 | 7/2013 | Yan et al. | |
| 8,702,393 B2 * | 4/2014 | Al-Azzawi | F03D 3/068 416/132 A |
| 2006/0188364 A1 | 8/2006 | Fritz | |
| 2012/0163976 A1 | 6/2012 | Batista et al. | |

FOREIGN PATENT DOCUMENTS

| | | |
|---|---|---|
| WO | WO-2009/109918 A2 | 9/2009 |
| WO | WO-2012/001320 A1 | 1/2012 |

* cited by examiner

VERTICAL AXIS WIND TURBINE WITH SELF-ORIENTATING BLADES

FIELD OF INVENTION

The invention is in the field of wind turbines. More specifically the present invention relates to a vertical axis wind turbine with self-orientating blades.

BACKGROUND OF THE INVENTION

Wind turbines convert kinetic energy from the wind into electrical power. A wind turbine is one of the cheapest ways to generate electric power as it uses a non-perishable natural resource that is free (unlike coal or oil) and exists most of the time in certain areas.

Wind turbines can rotate about either a horizontal (HAWT) or a vertical axis (VAWT), the former being both the older and the more common type. Every type of wind turbine has its own advantages and disadvantages. The main problems with most of the VAWTs are:
1. The blades of the classic turbines are found in an effective position relative to the wind direction for a short time only.
2. Their low rotation speed relative to HAWTs (in case of Savonius type turbines). The relatively low efficiency of this type VAWTs is caused by the difference between the drag forces of two blades which are located on opposite sides of the turbine. When one of the blades is on a first side of the turbine and "catches" the wind with its front side the turbine begins to rotate under the influence of the drag force on that blade. At the same time a second blade, which is on the opposite side of the turbine is also exposed to the same wind and drag force but from its back side resulting in a force that resists the rotation of the turbine.
3. In the case of Darrieus type of VAWT, external torque is required to cause initial rotation of the turbine.

VAWTs have been described in many different structures. One such structure is disclosed in U.S. Pat. No. 6,926,491. In this patent the sails pivot about one vertical edge of the sail that is attached to a vertical pole distanced from the central shaft on an arm that is perpendicular to it. When the wind blows, the sails rotate about a vertical shaft. As the sails rotate sails moving towards the wind are automatically feathered. As they move away from the wind they are prevented by sail restraints from being feathered. A sail restraint catches the sail as it swings in the wind adding energy to the rotational force.

Amongst other factors, the magnitude of the drag force on an object is proportional to the area of the silhouette of the object on a plane perpendicular to the direction of the wind, to the square of the relative speed of the wind and the object, and to the drag coefficient. In order to increase the efficiency of the turbine it is necessary:
1. To decrease as much as possible the drag on the blade that opposes the rotation.
2. To cause the blade to "catch" the wind and be effective relative to the wind direction for a longer time.
3. To combine the effects of both lift and drag for the overall advantage of the operation of the turbine i.e. to allow for the blades be some time under lift force and some time under drag force.

It is an object of the present invention to provide a system and method to increase the efficiency and the rotation speed of a Vertical Axis Wind Turbine (VAWT).

It is another object of the present invention to increase the drag force on the blade which rotates a VAWT and at the same time to orient the neighboring blade to decrease its drag force and to rotate the turbine by means of lift force.

Further purposes and advantages of this invention will appear as the description proceeds.

SUMMARY OF THE INVENTION

The invention is a vertical axis wind turbine comprised of the following elements:
 a base;
 a vertical shaft fixed to the base;
 at least three equally spaced horizontal arms attached to the vertical shaft;
 at least three vertical blade shafts, each blade shaft connected to one of the arms;
 at least three blades, each of the blades attached by means of bearings to one of the blade shafts; and
 two stoppers at the ends of each of the arms positioned to limit the range of rotation of the blades around the blade shafts.

Each of the blades has a rectangular central portion and one rectangular vertical tab attached to each vertical edge of the central portion and the central section of the blade is attached to the blade shaft at distances "a" and "b" from the respective inside edge of each of the tabs, wherein a<b.

In embodiments of the vertical axis wind turbine of the invention the at least three equally spaced horizontal arms are rigidly attached directly to the vertical shaft, which is attached to the base by bearings that allow the vertical shaft and the attached arms to rotate freely around the longitudinal symmetry axis of the vertical shaft.

In embodiments of the vertical axis wind turbine of the invention the vertical shaft is rigidly attached to the base and the at least three equally spaced horizontal arms are attached to the vertical shaft by means of a hub that is adapted to freely rotate about the vertical shaft.

Embodiments of the vertical axis wind turbine of the invention comprise one hub to which are rigidly attached at least three equally spaced horizontal arms, the hub located at either the top or the bottom of the vertical shaft.

Embodiments of the vertical axis wind turbine of the invention comprise two hubs to each of which are rigidly attached at least three equally spaced horizontal arms; wherein, one of the hubs is located at the top and one of the hubs is located at the bottom of the vertical shaft, wherein the top of each of the vertical blade shafts is attached to one of the arms attached to the top hub and the bottom of each of the vertical blade shafts is attached to one of the arms attached to the bottom hub.

In embodiments of the vertical axis wind turbine of the invention each of the blades is made of a stiff material, which can be chosen from: a metallic sheet, reinforced plastic, or a composite material.

In embodiments of the vertical axis wind turbine of the invention the central section and the tabs with width c and d of each blade are made from planar pieces of rigid material and each of the tabs is rigidly connected to the central section respectively at angles $\beta 1$ and $\beta 2$ that remain constant as the blade rotates around the blade shaft.

In embodiments of the vertical axis wind turbine of the invention the blade is made of a single planar piece of rigid material bent at opposite edges to form a central section and the two tabs.

In embodiments of the vertical axis wind turbine of the invention the blade is made of a single piece of rigid material bent and shaped to have a cross-section with an aerodynamic profile. Its bent edges playing the role of the tabs.

In embodiments of the vertical axis wind turbine of the invention the central section and the tabs with width c and d of each blade are made from planar pieces of rigid material and each of the tabs is connected to the central section by means that allow them to rotate about a vertical tab axis and allow respective angles β1 and β2 between each of the tabs and the central section to constantly change as the blade rotates around the blade shaft. These embodiments of the vertical axis wind turbine of the invention comprise links that are connected to the arms and the tabs by means of link joints that allow the links to swivel and cause the tabs to rotate about their respective tab axis as the wind causes the blade to rotate about its blade shaft.

In embodiments of the vertical axis wind turbine of the invention the geometry of the central section and the tabs are three parts of one symmetric airfoil. The tabs rotate relative central part of the blade in angles β1 and β2 respectively. These embodiments of the vertical axis wind turbine of the invention comprise links that are connected to the arms and the tabs by means of link joints that allow the links to swivel and cause the tabs to rotate about their respective tab axis as the wind causes the blade to rotate about its blade shaft.

In embodiments of the vertical axis wind turbine of the invention the central section and the tabs of each blade are made from rectangular pieces of rigid material that have been bent into a wave-like shape and each of the tabs is rigidly connected to the central section. In these embodiments the central section and the tabs of each blade can be made from a single rectangular sheet of rigid material that is bent into a wave-like shape. In these embodiments the wave-like shapes of the central section and the tabs of each blade are created such that when either side of the blade is oriented at ninety degrees to the direction of the wind, the force of the wind on the blade is essentially the same.

All the above and other characteristics and advantages of the invention will be further understood through the following illustrative and non-limitative description of embodiments thereof, with reference to the appended drawings.

DETAILED DESCRIPTION OF THE DRAWINGS

The invention is a wind turbine that is part of a system for utilizing the energy of wind to produce electrical energy. The turbine is a vertical axis wind turbine that is characterized by the design of its blades. The blades are shaped and attached to the turbine in a way that allows them to self-adjust their orientation with respect to the direction in which the wind is blowing. In this way the torque that each blade exerts on the turbine consist of two portions. When the blade is on the windward side of the turbine, it exerts on the turbine torque from the drag force. When the blade is on the leeward side of the turbine, the torque that blade exerts on the turbine is from lift force.

Figure 1A:
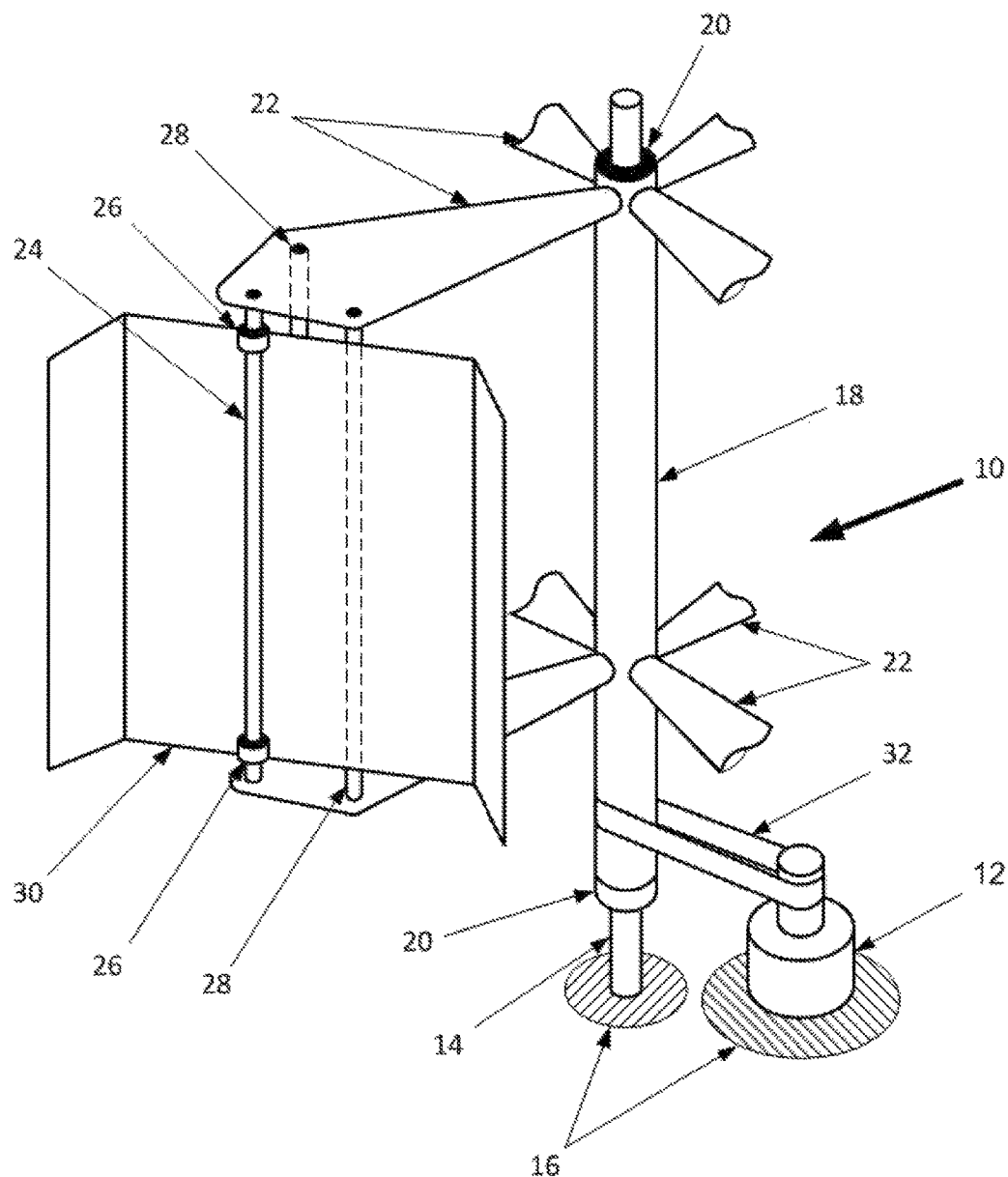
FIG. 1A schematically shows a system for harnessing wind energy to generate electricity.

FIG. 1A schematically shows an embodiment of a system for harnessing wind energy to generate electricity according to a first embodiment of the invention. The system is comprised of two main elements: a vertical axis wind turbine 10 and a generator 12.

The turbine 10 is comprised of the following elements:
a base 16;
a vertical shaft 14 securely fixed in base 16;
a hub, in this embodiment pipe 18, slipped over shaft 14;
bearings 20 attached to shaft 14, in this embodiment at the top and the bottom ends of pipe 18 to support the hub, e.g. pipe 18, and to allow it to freely rotate—without wobbling—around its common vertical axis with shaft 14;
arms 22 that are fixedly attached to the hub, in this embodiment there are eight arms arranged in two sets—one set of four arms 22 located near the top of pipe 18 and the second set of four arms 22 located near the bottom of pipe 18;
blade shafts 24 that are connected at their top ends to an arm 22 in the upper set of arms and connected at their bottom ends to the corresponding arm 22 in the lower set of arms;
a blade 30 connected by means of bearings 26 at its top and bottom to each of the blade shafts 24 such that blade 30 can freely rotate around blade shaft 24; and
stoppers 28, which in this embodiment are two rods connected at their top ends to an arm 22 in the upper set of arms and connected at their bottom ends to the corresponding arm 22 in the lower set of arms; stoppers 28 act to limit the range of rotation of blade 30 around blade shaft 24.

Generator 12 is also shown attached to a base 16. It is mechanically shown coupled to pipe 18 by means of a belt 32 that symbolically represents any mechanical connection known in the art, e.g. a gear train, which can be used to transfer the rotational motion of pipe 18 to the shaft of generator 12.

The arms 22 supporting the blades 30 can be attached to the turbine 10 in other ways. For example, in one embodiment there may not be a hub, i.e. pipe 18, and the arms 22 are fixedly attached directly to vertical shaft 14, which is attached to base 16 by bearings 26 that allow vertical shaft 14 and attached arms 22 to rotate freely around the longitudinal symmetry axis of vertical shaft 14. In another embodiment, the long pipe 18 may be replaced with one or two short sections of pipe, each acting as a separate hub attached to shaft 14 by bearings 26 that allow each of the one or two hubs and arms 22 attached to them to freely rotate about vertical shaft 14.

Figure 1B:
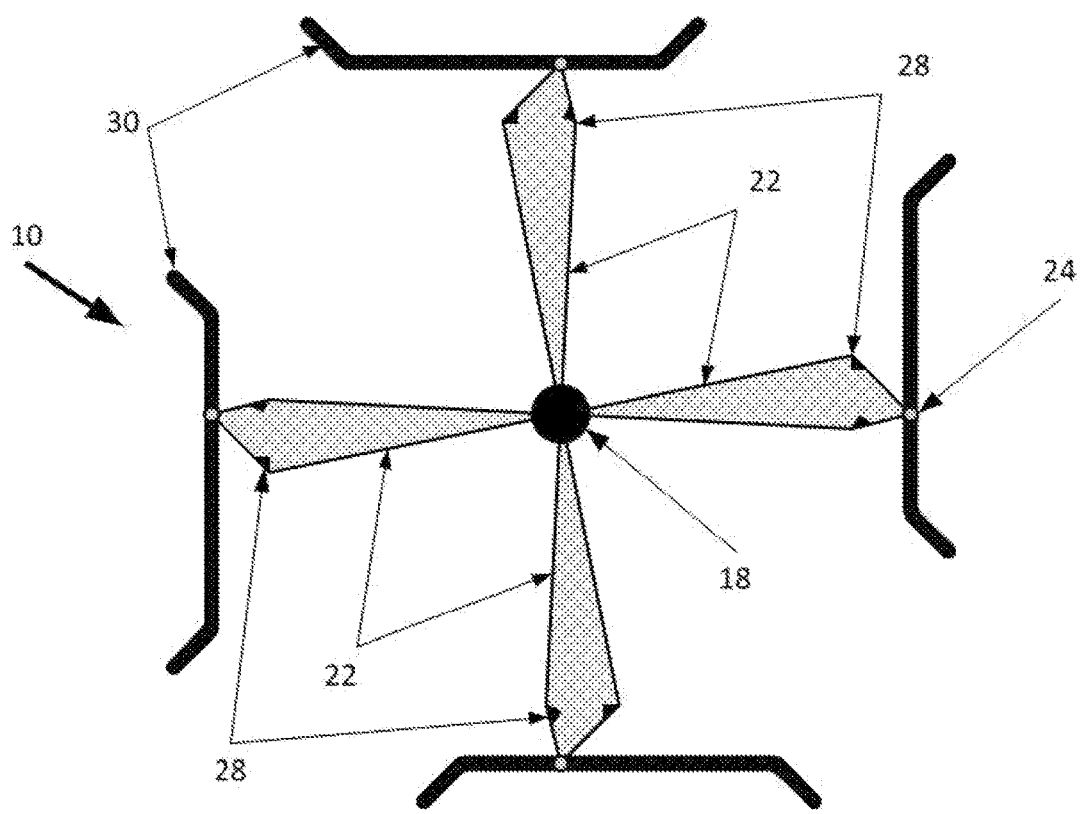
FIG. 1B schematically shows a top view of the turbine in FIG. 1A.

FIG. 1B schematically shows a top view of the turbine 10. The turbine 10 rotates around shaft 14 (shown in FIG. 1A). In this top view four equally spaced arms 22 are shown fixedly attached to pipe 18. A second set of arms is attached near the bottom of pipe 18 as seen in FIG. 1A. A vertically oriented blade 30, made of a stiff material such as a metallic sheet, reinforced plastic, or a composite material is attached to blade shaft 24 at the end of each arm 22 by means of bearings that allow it to rotate around blade shaft 24 (see FIG. 1A), which is parallel to the common axis of the pipe 18 and central vertical shaft 14. Two additional stoppers 28 at the end of each arm 22 limit the rotation of the blade 30 around blade shaft 24.

In different embodiments the wind turbine can comprise three blades or more than four blades as shown in the figures, the blade shafts 24 can be replaced by tensioned cables, the rods that act as stoppers 28 can be also be replaced by cables or other kinds of mechanical stoppers attached to the arms 22, and the turbine might comprise only an upper or lower set of arms 22 depending on the size and strength of the blades 30 and blade shafts 24 and the magnitude of the forces exerted on the blades by the wind.

Figure 2:
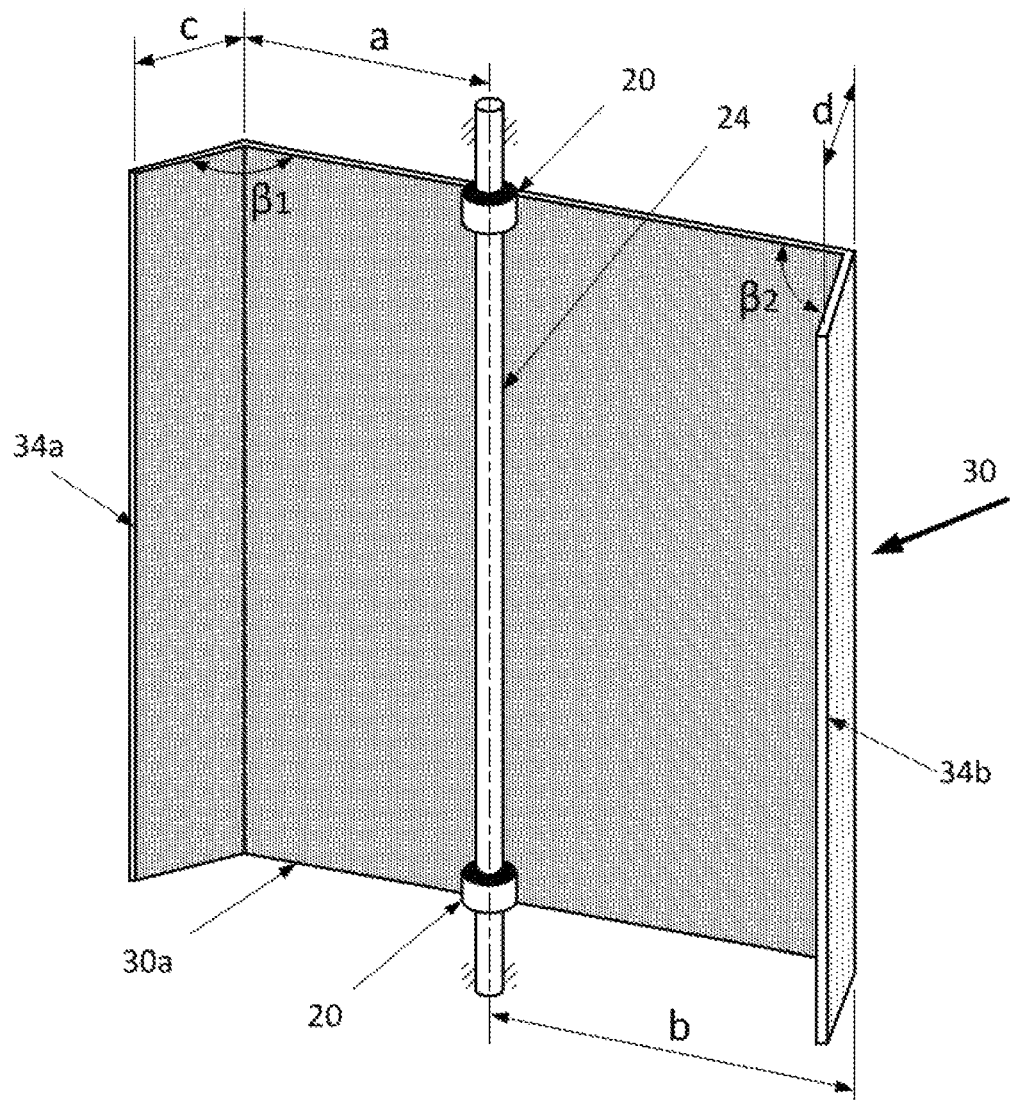
FIG. 2 schematically shows a structure of a turbine blade according to the first embodiment of the invention.

FIG. 2 schematically shows the structure of a first embodiment of the blades of the turbine. In this embodiment the blade 30 has a structure that is the equivalent of that of a single sheet of material that is bent to create a central section with vertical tabs 34a and 34b with width c and d that form angles $\beta 1$ and $\beta 2$ respectively with the central section of the blade. For a reason that will be understood from the description of FIGS. 3 to 9 herein below, the blade shaft 24 is attached to blade 30 not in the middle of the blade, but is located at distance "a" less than "b" from the two edges of the central section of the blade as shown in FIG. 2.

The values of the parameters a, b, c, d, $\beta 1$, and $\beta 2$ depend on other factors such as the width of the blade, width of the tabs, and number of blades can be determined using methods that are well known in the art for a specific case. The inventor has built a model prototype in order to demonstrate the feasibility of the invention. The blades of the prototype have a drag coefficient of approximately 2.3 when they are perpendicular to the wind direction and are able to maintain the desired orientation with respect to the wind as the turbine rotates.

FIG. 3 to FIG. 9 schematically show different stages in the orientation of the blades of the first embodiment as the turbine is rotated with the linear velocity of the blades less than the wind velocity.

Figure 3:
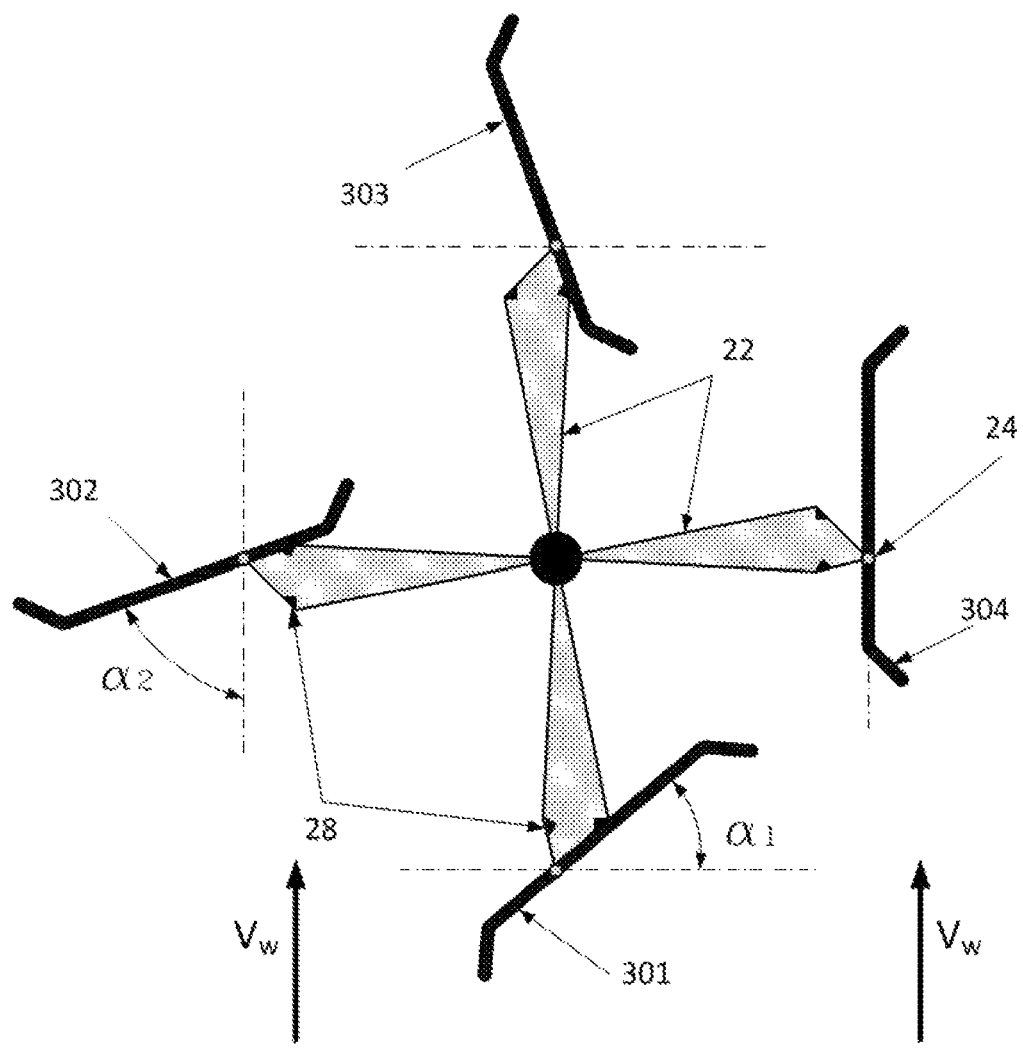
FIG. 3 to FIG. 9 schematically show different stages in the orientation of the blades of the first embodiment as the turbine is rotated.

FIG. 3 schematically shows the turbine with the blades in a first position. When the wind begins blowing in the direction indicated by arrow $V_w$, the force it exerts on each blade causes the blade to rotate around its blade shaft 24 from its initial orientation as shown in FIG. 1B and to assume a different angle with the arm 22 to which it is attached as shown in FIG. 3. The wind on blade 302 causes blade 302 to rotate about blade shaft 24 until further rotation is prevented by stopper 28, at an angle $\alpha 2$ between the central section of blade 302 and a virtual line passing through blade shaft 24 at right angles to the tip of the arm 22 to which blade 302 is connected. (Note that in FIGS. 3 to 9, all angles $\alpha$ are measured with respect to a virtual line oriented as described in the previous sentence.) In a similar manner blade 301 is rotated by the force of the wind about its blade shaft 24 until the rotation is stopped by stopper 28 at an angle of $\alpha 1$. The wind flow rotates blade 303 until it reaches stopper 28 and causes blade 304 to rotate so that the blade is oriented in a position of minimal resistance to the turbine's rotation.

The turbine is designed in such a way that with the beginning of the wind flow, there is always one blade whose drag force will give the turbine initial torque. When the turbine is rotating and the linear speed of the blades is lower than the wind speed, at all times at least one blade "pushes" the turbine due to the drag force and least one blade develops torque from lift force. In case the linear speed of the blades is higher than the wind speed, the lift force is a factor in rotating the turbine.

Now blade 302 is found in the effective range of the drag force and blade 301 "pushes" the turbine by means of lift force. Blades 303 and 304 are oriented for minimal resistance to turbine rotation. The sum of the forces exerted by the wind on all of the blades causes the turbine as a whole to rotate about the central shaft 14.

Figure 4:
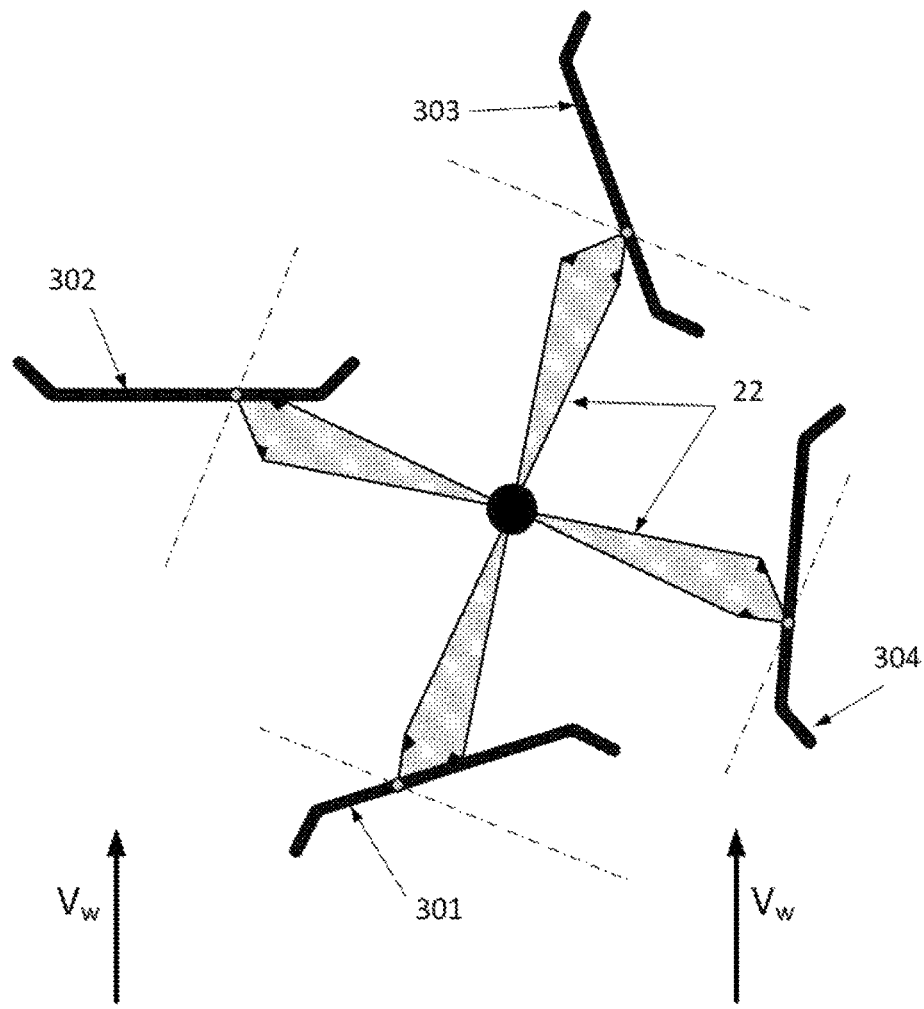

In FIG. 4 it can be seen that blade 302 is in the range of efficiency of the drag force and as the wind pushes against blade 302, blade 302 pushes the arm to which it is attached causing the turbine to rotate. As the turbine continues to rotate, the efficiency of blade 302 decreases; however, the drag force efficiency of blade 301 increases and at the same time its lift force efficiency decreases. So blade 301 also contributes to the force rotating the turbine by its drag force. At the same time, blade 303 is positioned in an angle where its opposition to the wind is minimal. Blade 304 has entered into efficiency range of lift force and contributes to the turbine's rotation.

Figure 5:
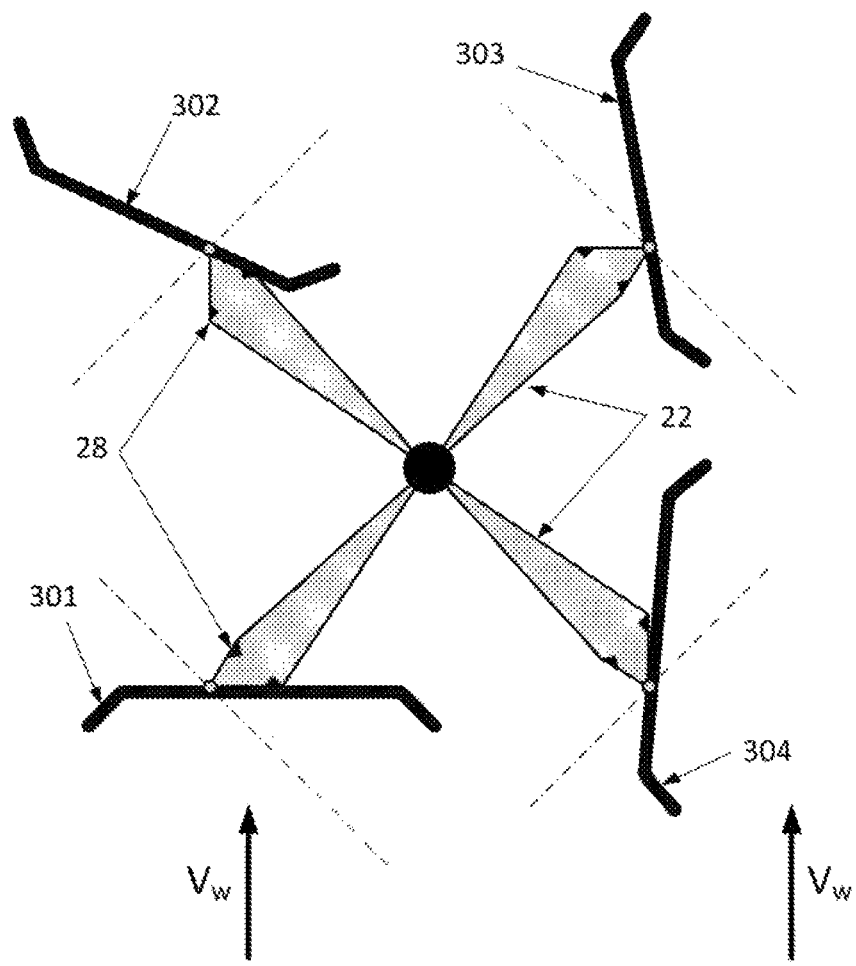

As the turbine turns, it can be seen in FIG. 5 that blade 301 reaches a position of maximum efficiency of the drag force and exerts maximum drag force to cause the turbine to rotate. The efficiency of blade 302 is now much lower but it continues to make a small contribution to the rotation of the turbine. Blade 304 is found in lift force efficiency range and exerts lift force. Blade 303 is still found at orientations that presents minimal opposition to the wind and therefore minimal opposition to rotation of the turbine.

Figure 6:
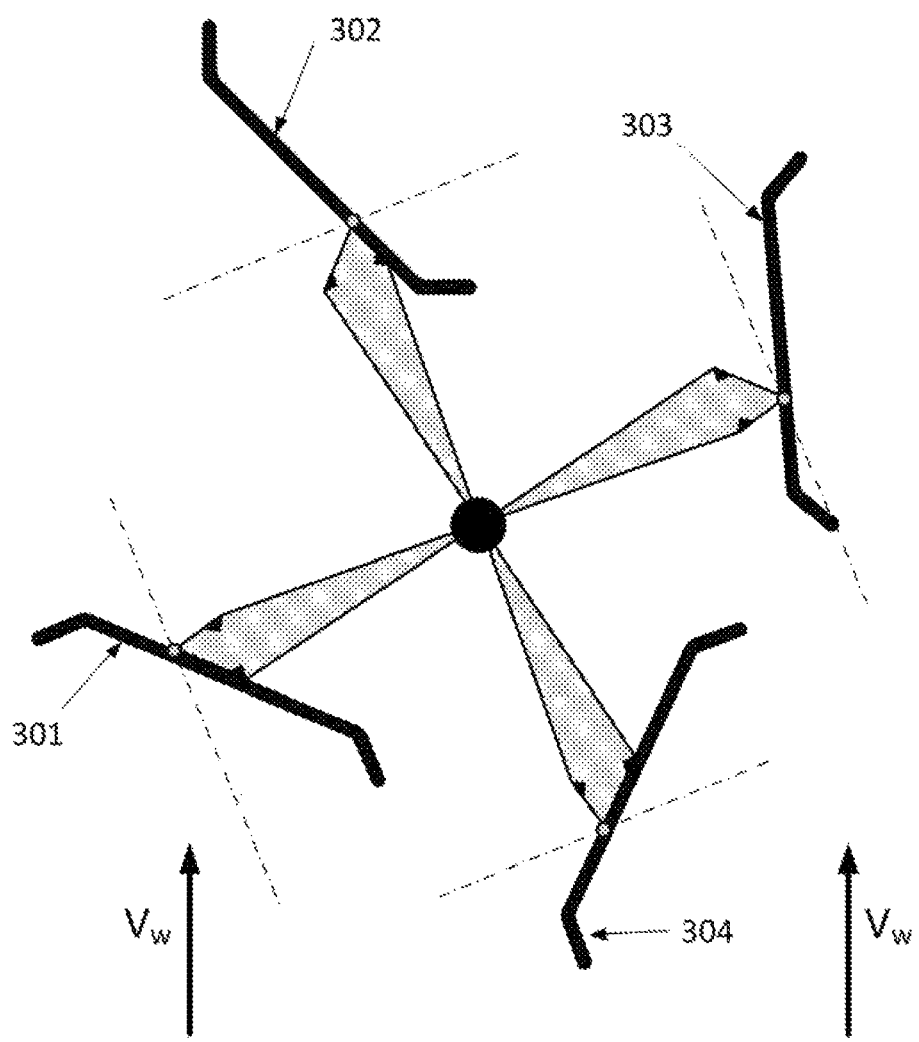
Figure 7:
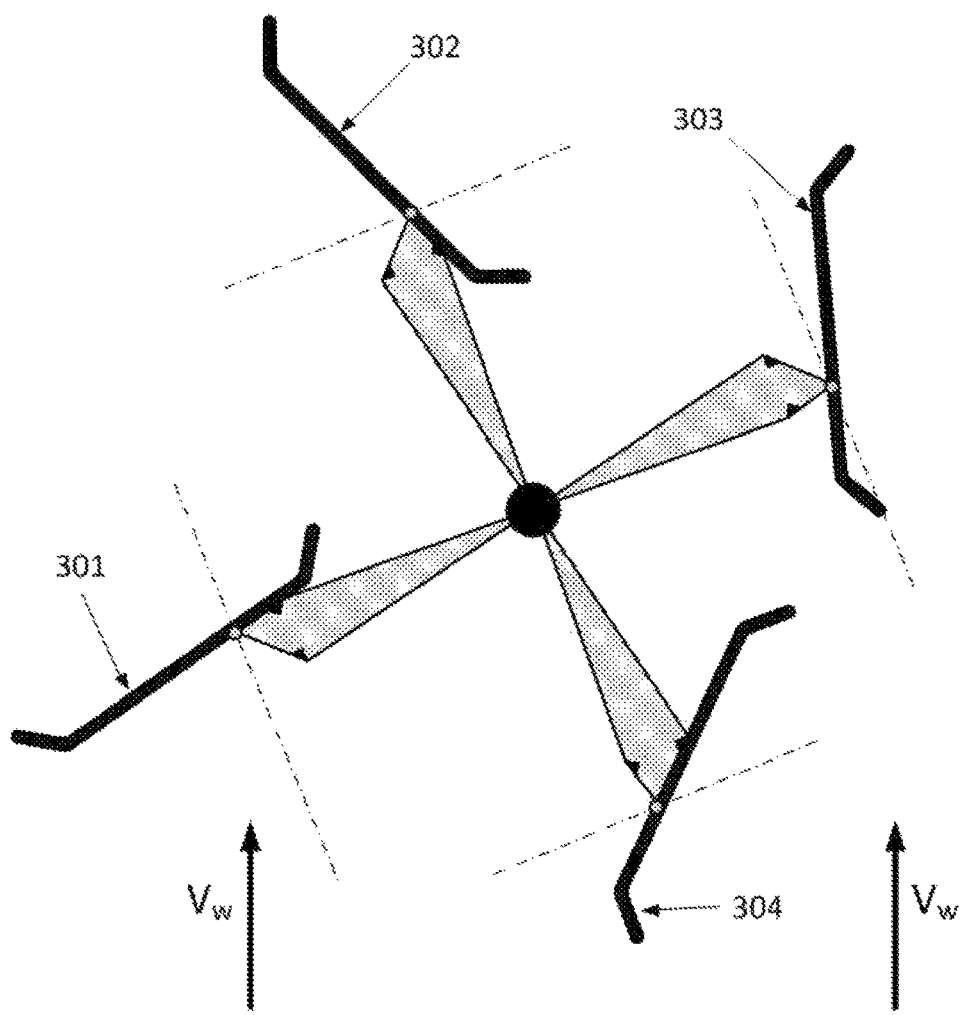

In FIG. 6 the turbine continues rotating. Blade 301 is now at an angle with respect to the wind direction at which the drag force efficiency of the blade in causing the turbine to rotate decreases. In this orientation, as a result of the geometry of the blade, e.g. the ratio a:b, the values of angles $\beta 1$ and $\beta 2$, and the width of the tabs c and d, causes the drag forces on the sides of the blade on both sides of blade shaft 24 to be equivalent. In the next instance the drag force on the shorter side, i.e. side with width a, of the blade 301 becomes larger causing the blade to "flip over" until the short side is pressed against the stopper on the other side of the arm as shown in FIG. 7 and the drag force efficiency of blade 301 again increases. Blade 304 is still found in range of lift force efficiency.

Figure 8:
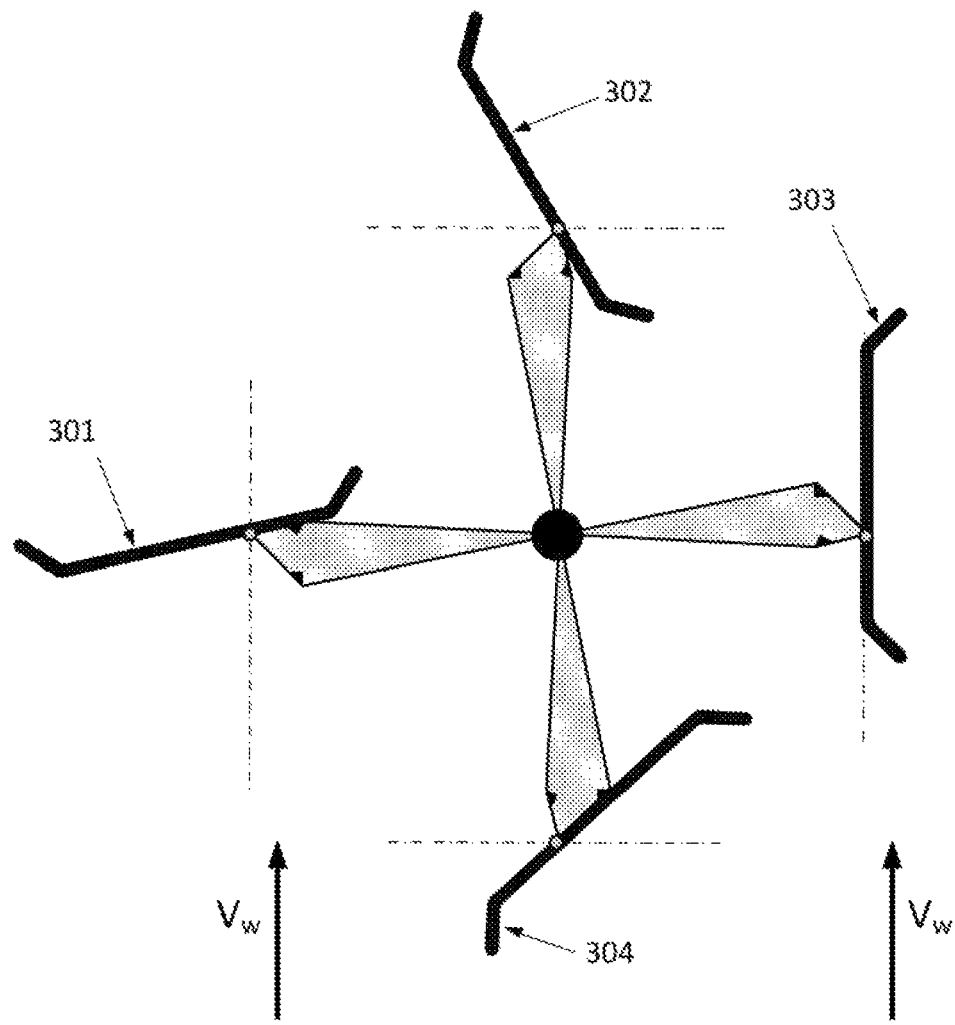
Figure 9:
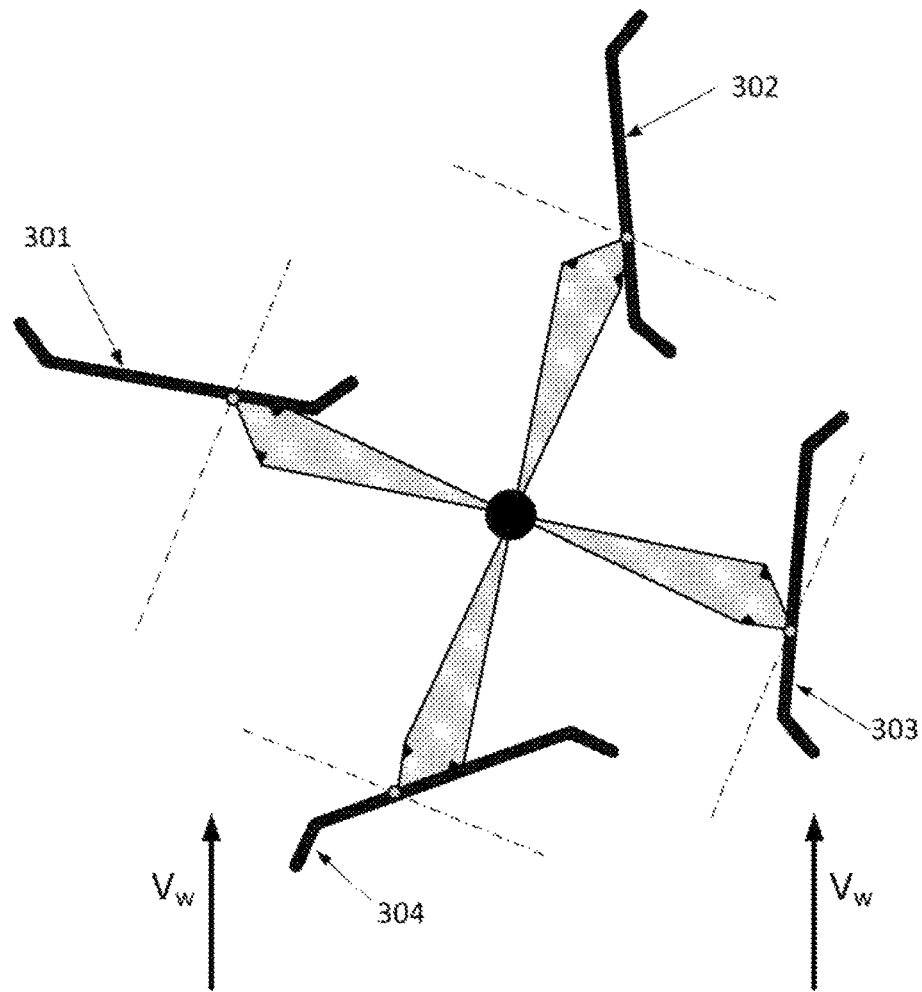

FIG. 8 shows how blade 301 keeps pushing the turbine and arrives at an orientation in which its drag force efficiency is maximal a second time. Lift force efficiency of blade 304 still is high thanks to large angle of attack. FIG. 9 shows that, as the turbine keeps rotating, the drag force efficiency of blade 301 decreases and drag force efficiency of blade 304 increases, blade 303 enters the range of lift force efficiency and a new phase starts and repeats as long as the wind continues blowing.

Figure 10:
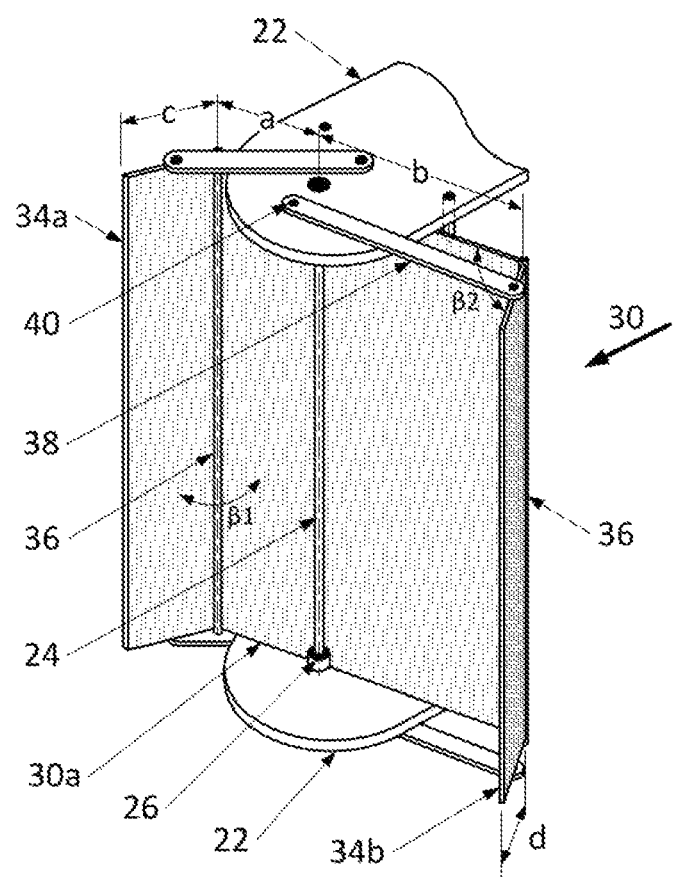
FIG. 10 schematically shows the structure of the blade according to a second embodiment of the invention.
Figure 11:
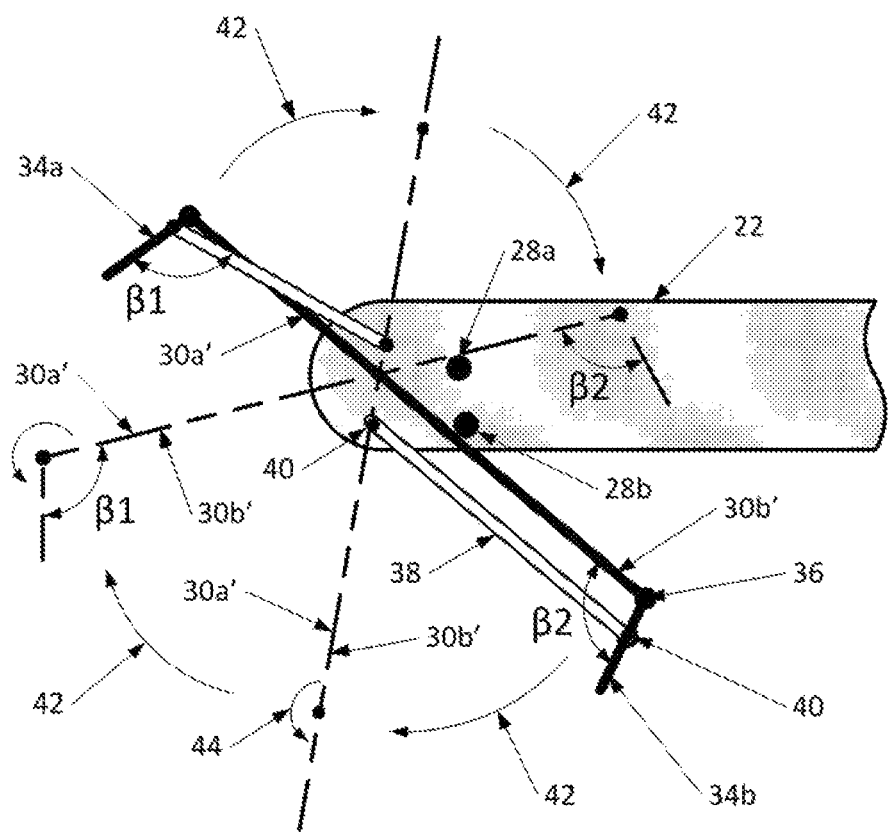
FIG. 11 schematically shows a top view of the blade according to the second embodiment of the invention.
Figure 12:
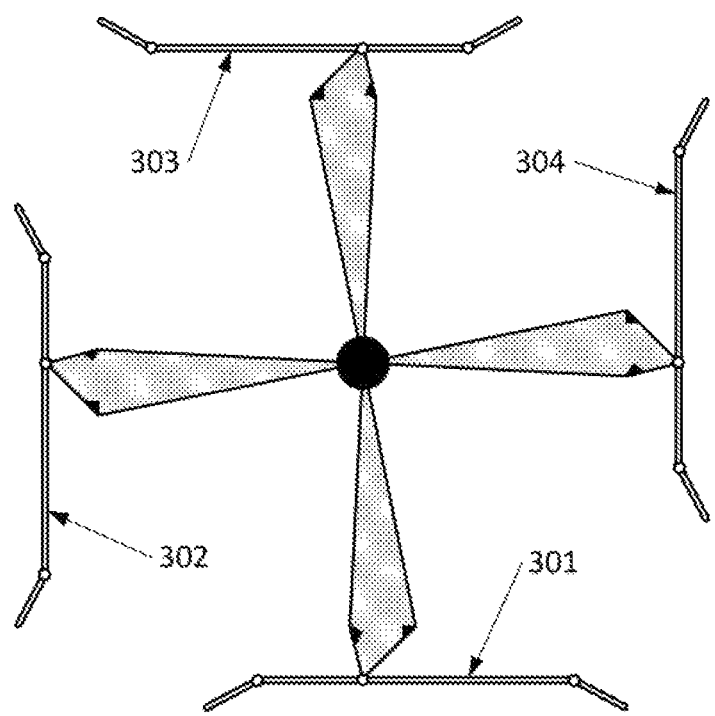
FIG. 12 to FIG. 19 schematically show different stages in the orientation of the blades and blade tabs of the second embodiment as the turbine is rotated.
Figure 13:
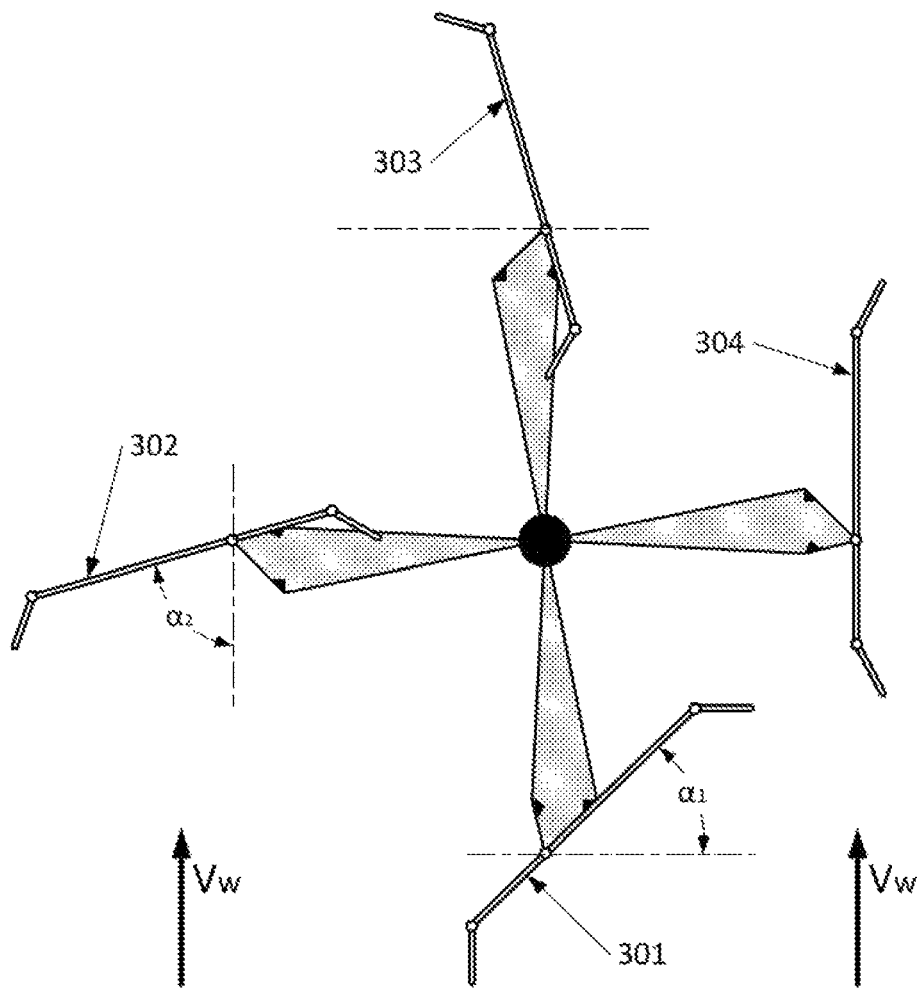
Figure 14:
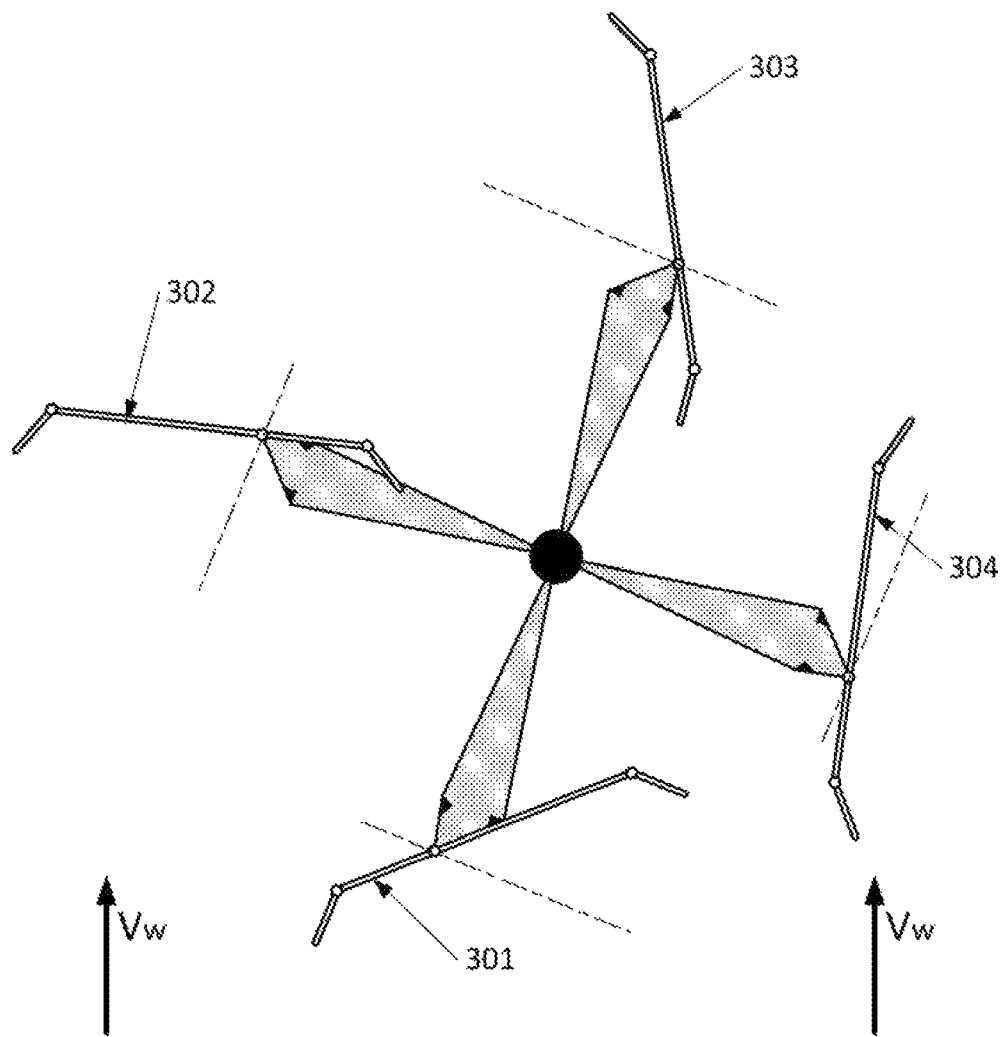
Figure 15:
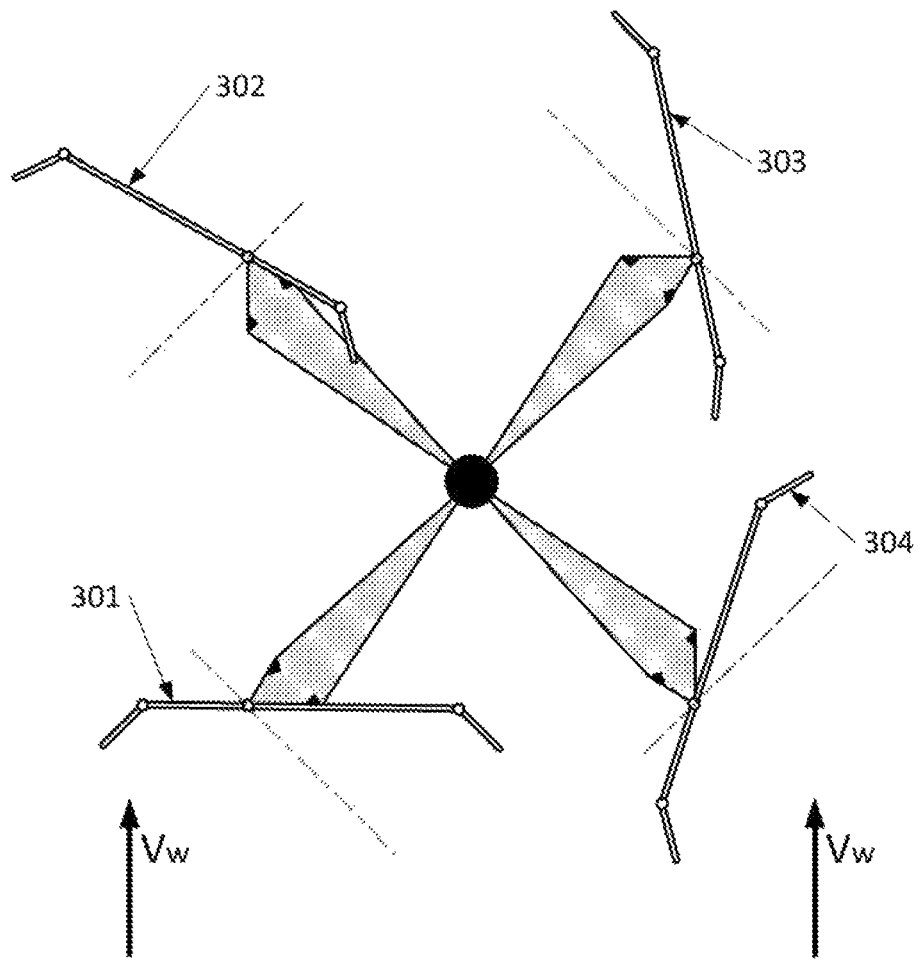

FIG. 10 and FIG. 11 schematically show a second embodiment of a turbine blade according to the invention. In this embodiment the tabs 34a and 34b and central portion 30a of blade 30 are not constructed of one piece. The tabs 34a and 34b are individual pieces that are attached to the central portion 30a by hinges or some other arrangement that allows them to rotate about a tab axis 36. As in the first embodiment of the blade, blade shaft 24 is attached to blade 30 not in the middle of the blade, but is located at distance "a" less than "b" from the two edges of the central portion 30a of blade 30.

FIG. 10 schematically shows the attachment of blade 30 to upper and lower arms 22. Links 38 are connected to the arms and tabs by means of link joints 40 that allow the links to swivel and cause tabs 34a and 34b to change their orientation with respect to the central portion 30a of the blade as the wind causes blade 30 to rotate about blade shaft 24.

FIG. 11 schematically shows how the angles between each of the tabs 34a and 34b and the central portion 30a change as the blade 30 rotates in the direction indicated by arrows 42. Stoppers 28b and 28a on arm 22 limit the rotation of the central portion 30a (see FIG. 2) of blade 30 (see FIG. 2) between a first position (the elements of the blade are shown with solid lines) in which face 30b' of the long side (length b—see FIG. 2) of the central portion 30a is pressed against stopper 28b and a second position (the elements of the blade are shown with dashed lines) in which face 30b' of the short side (length a—see FIG. 2) of the central portion 30a is pressed against stopper 28a. Initially face 30a' of the central section of the blade is facing the wind and the links 38 force the tabs into an orientation in which the angles between face 30a' and the tabs are β1 and β2 respectively. When the blade arrives at an orientation relative to the wind direction at which its drag force efficiency decreases, blade geometry, e.g. the ratio a:b, the values of angles β1 and β2, and the width of the tabs c and d, causes the drag forces on the both sides of the blade relative to shaft 24 to be equivalent. In the next instance the drag force on the shorter side, i.e. the side with width a, of the blade 30 becomes larger causing the blade to "flip over" and the blade assumes the second position with face 30b' of central section 30a facing the wind. As the blade rotates from the first position to the second position in direction 42, the blade passes an intermediate position at which the links 38 force the tabs to take the angles 180 degrees between the tabs 34a and 34b and face 30a' (indicated by curved arrow 44). In the second position, links 38 force the tabs to assume the same orientation, i.e. angles β1 and β2 but now with respect to side 30b'.

FIG. 12 to FIG. 19 schematically show the changing orientation of the blades and the blade tabs according to the second embodiment of the invention relative to the wind, blowing in direction Vw, as the turbine is rotated. In these figures only the arms, central portion of the blades and the blade tabs are shown. These figures are respectively analogous to FIG. 1B and FIG. 3 to FIG. 9. The description of the orientations of blades 301 to 304 in FIG. 12 to FIG. 19 is the same mutatis mutandis as that for the corresponding blades in FIG. 1B and FIG. 3 to FIG. 9.

Figure 16:
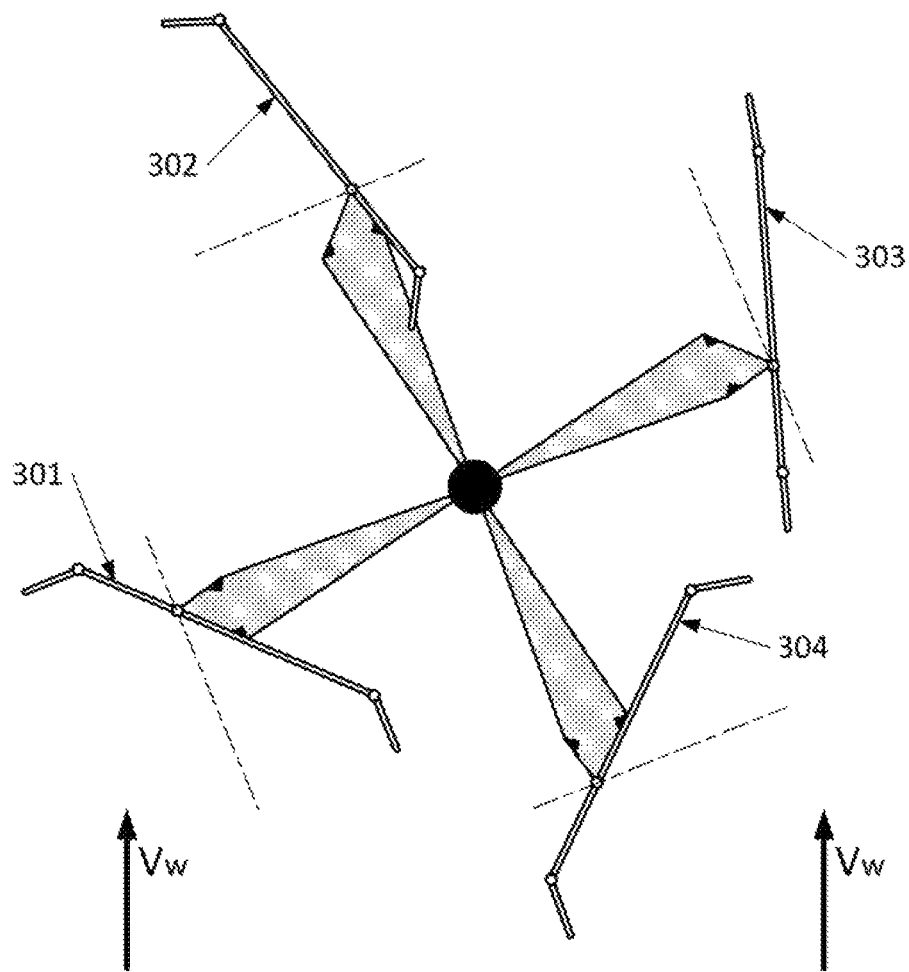
Figure 17:
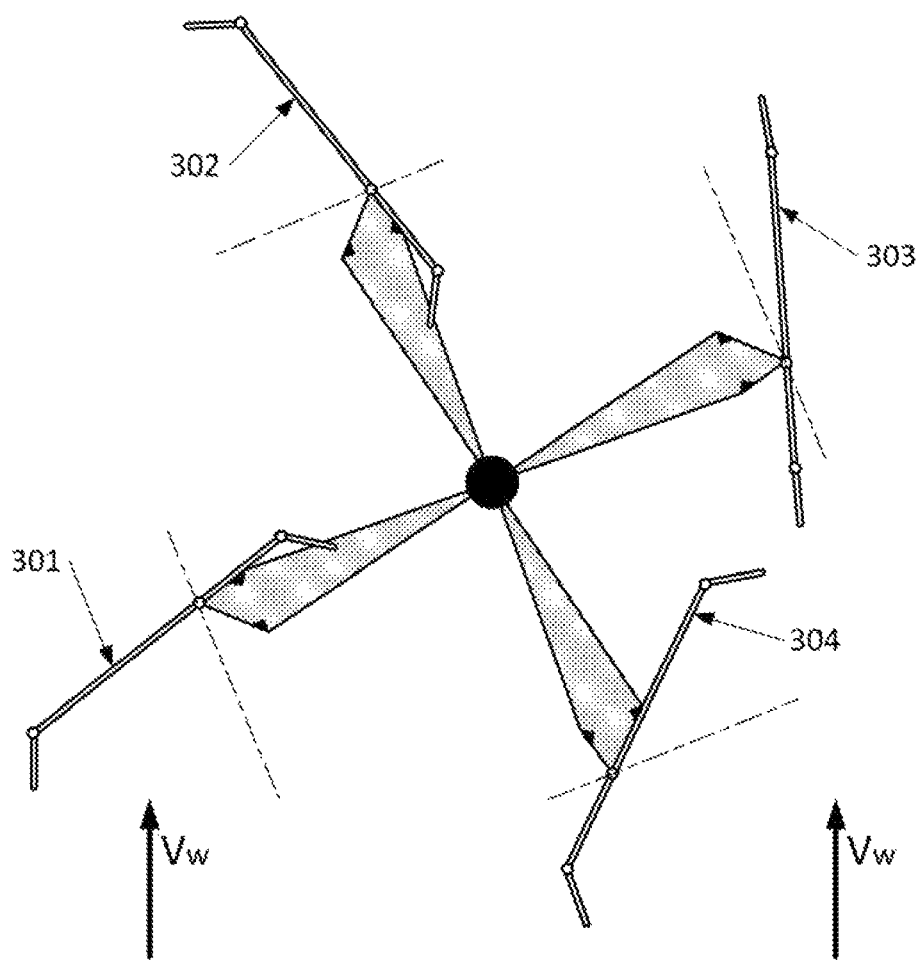
Figure 18:
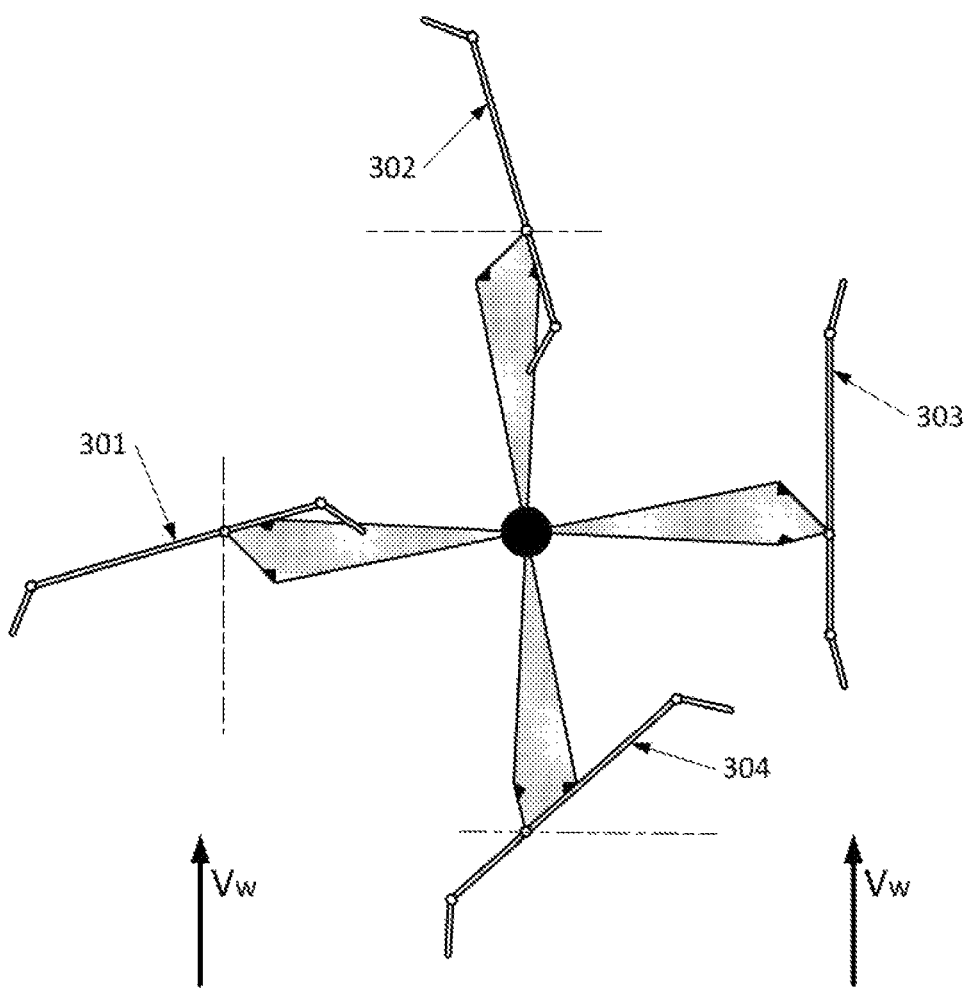
Figure 19:
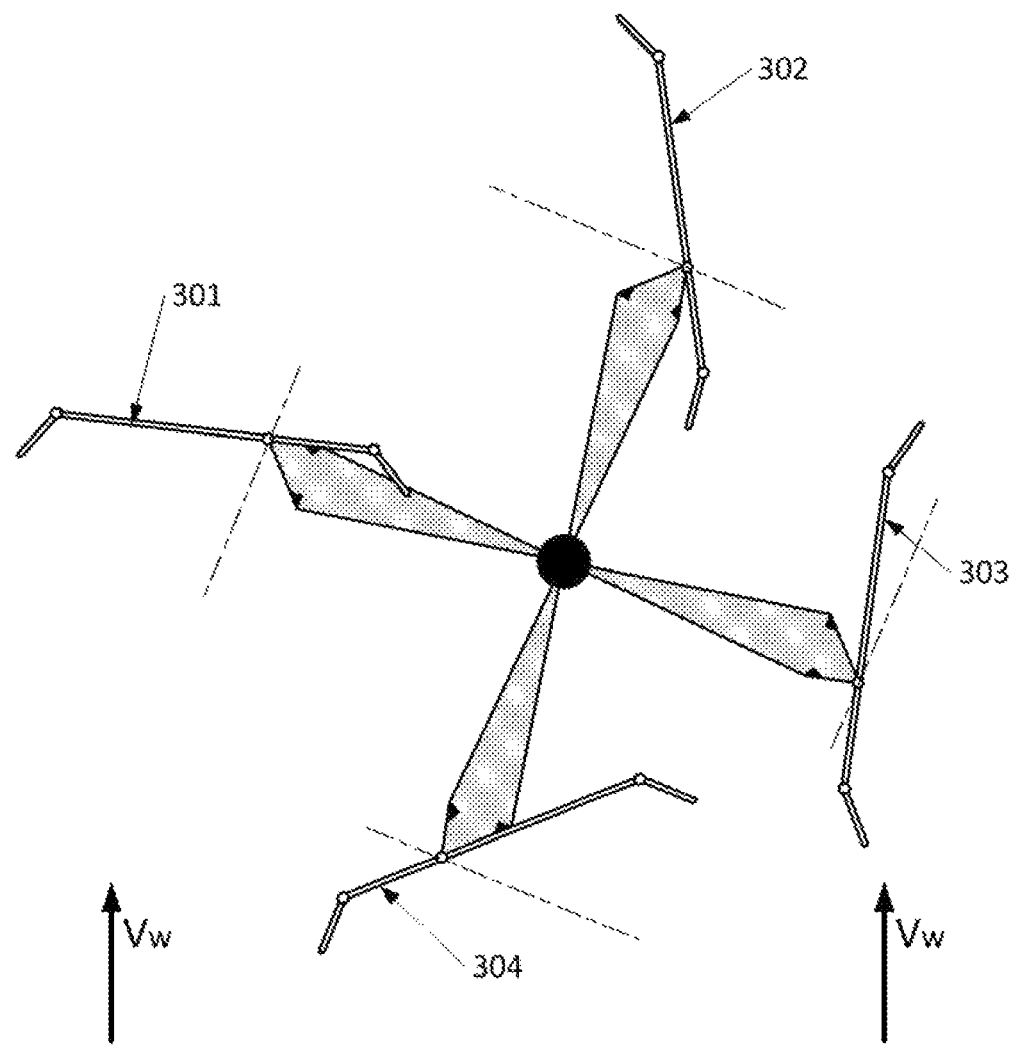

The difference between the two embodiments of the blade is seen in the transition between the position of the blade shown in FIG. 6/FIG. 16 and that it FIG. 7/FIG. 17. In the first embodiment, when the blade "flips over" the tabs 34a and 34b are pointing in the direction the wind is blowing. In contrast, in the second embodiment, as the blade "flips over" the tabs rotate about their individual tab axis, as shown in FIG. 11 such that after "flip over" the blade meets the wind with the same configuration as before "flip over" thereby maintaining the maximum value of the coefficient of drag. In addition, due to rotation of the tabs, in each position all blades can contribute to the rotation of the turbine by being in either the drag force efficiency range or the lift force efficiency range with the exception of the positions of blade 304 in FIG. 13 and blade 303 in FIGS. 16, 17 and 18. From the figures it can be understood how in the second embodiment the tabs change the surface area of the blade that is exposed to the force of the wind in a way that increases the force on the blade when it is in both ranges of efficiency. As a result the blades of the second embodiment exert a greater driving force than those of the first embodiment when the blades are in the drag and lift ranges of efficiency.

Figure 20:
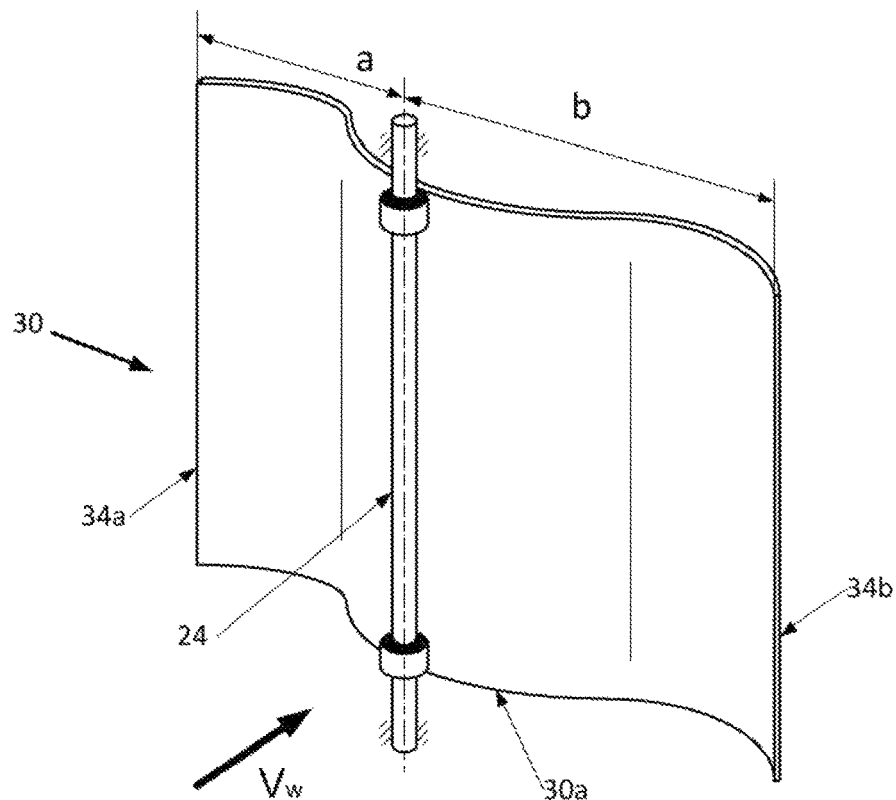
FIG. 20 schematically shows a turbine blade according to a third embodiment of the invention.
Figure 21:
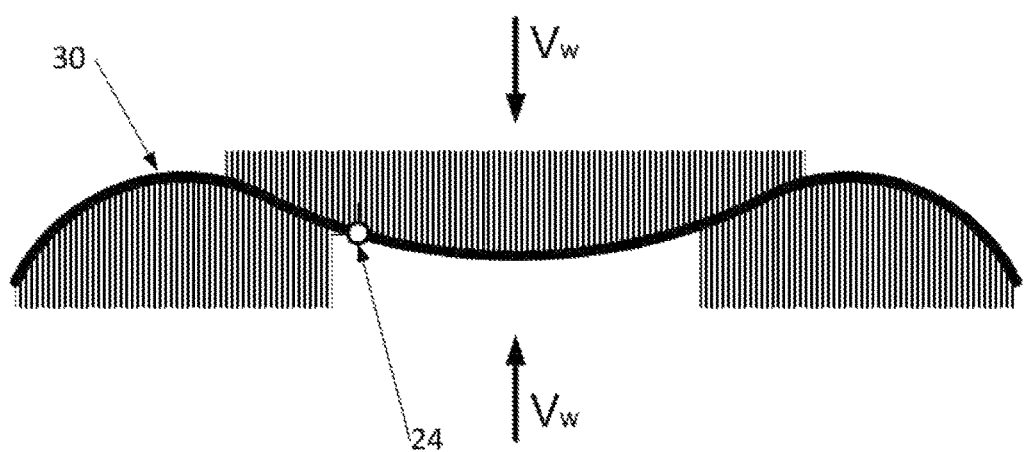
FIG. 21 schematically shows a top view of the blade according to the third embodiment of the invention.
Figure 22:
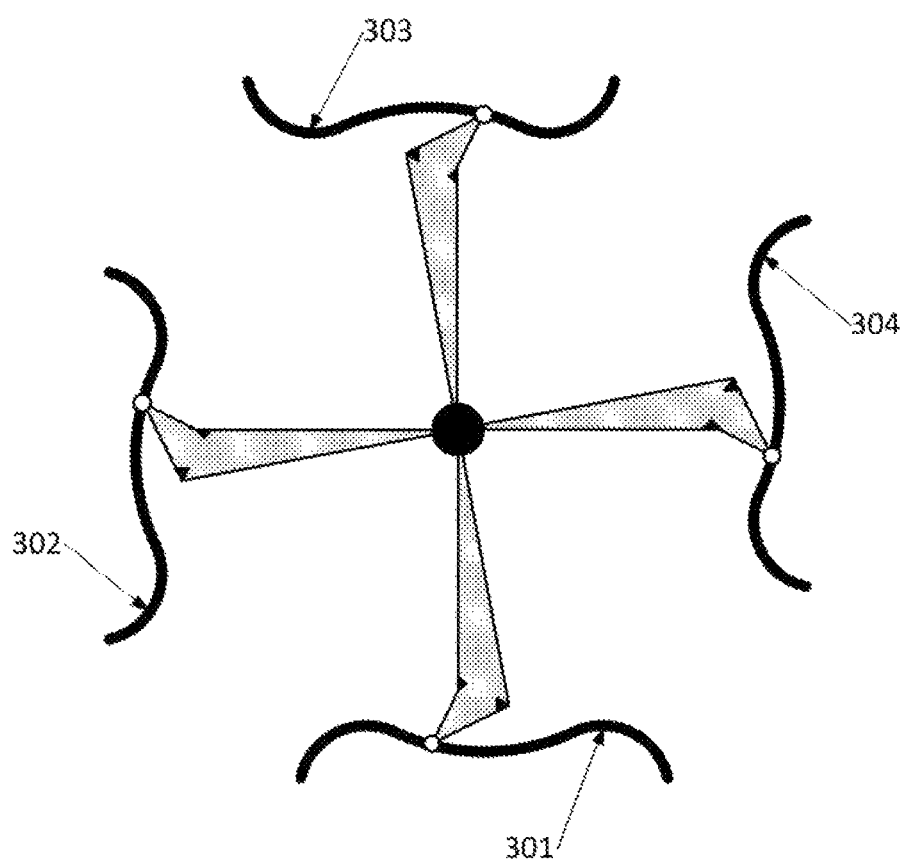
FIG. 22 to FIG. 29 schematically show different stages in the orientation of the blades of the third embodiment as the turbine is rotated.
Figure 23:
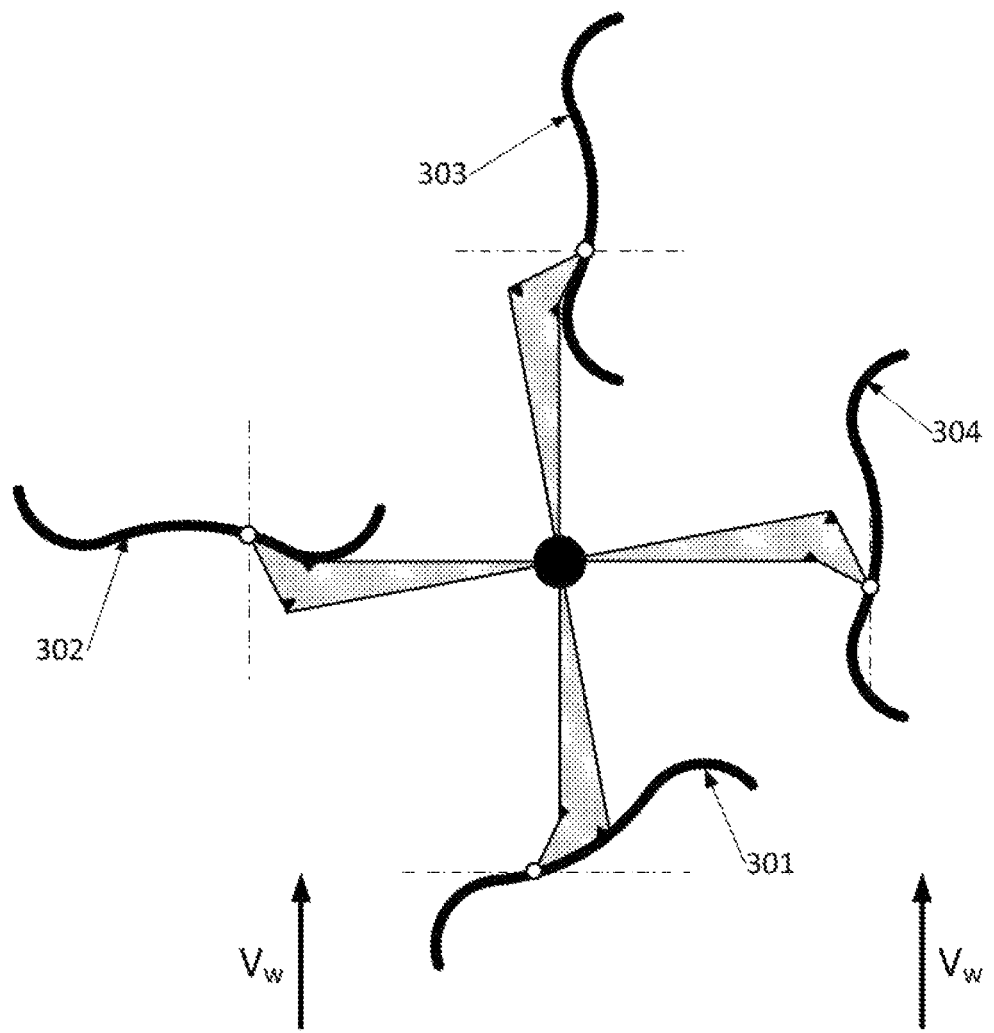
Figure 24:
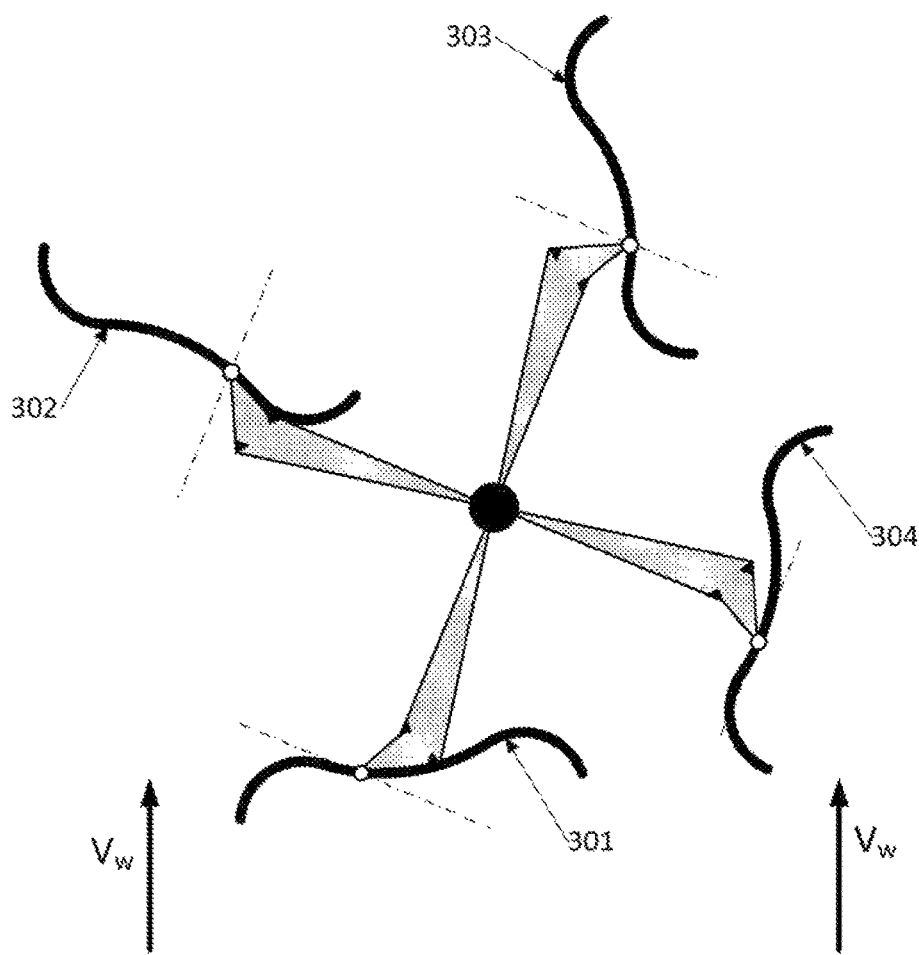
Figure 25:
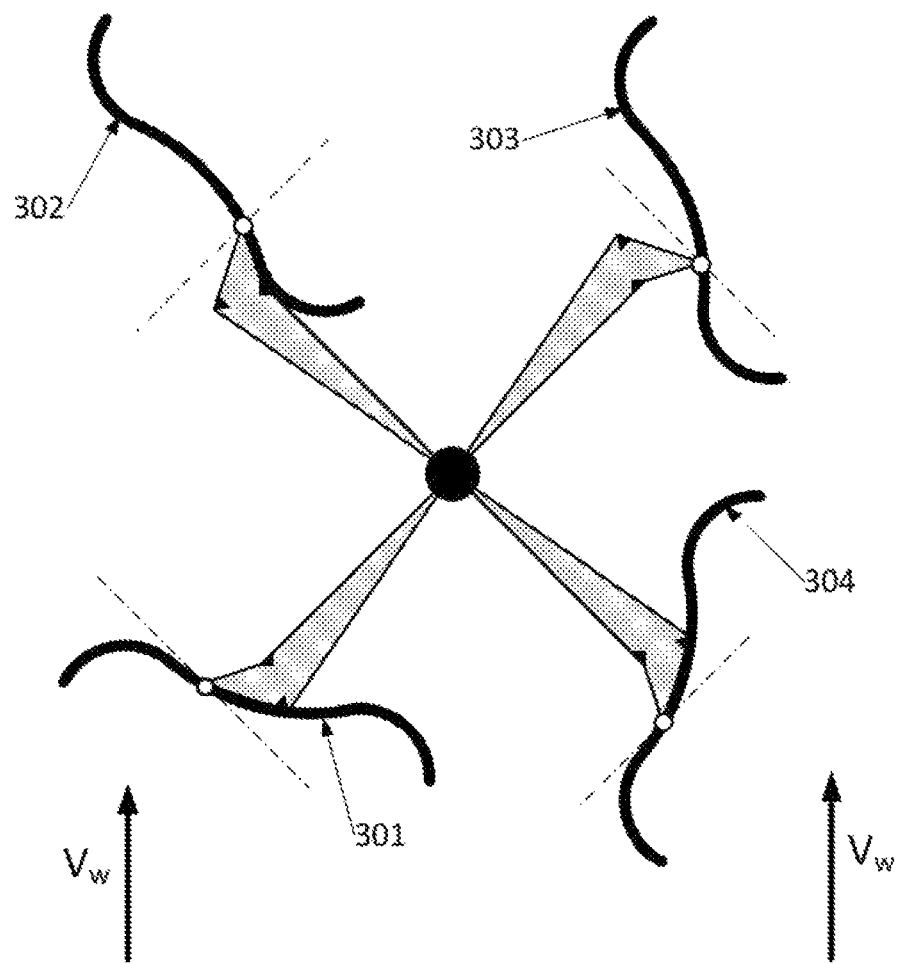
Figure 26:
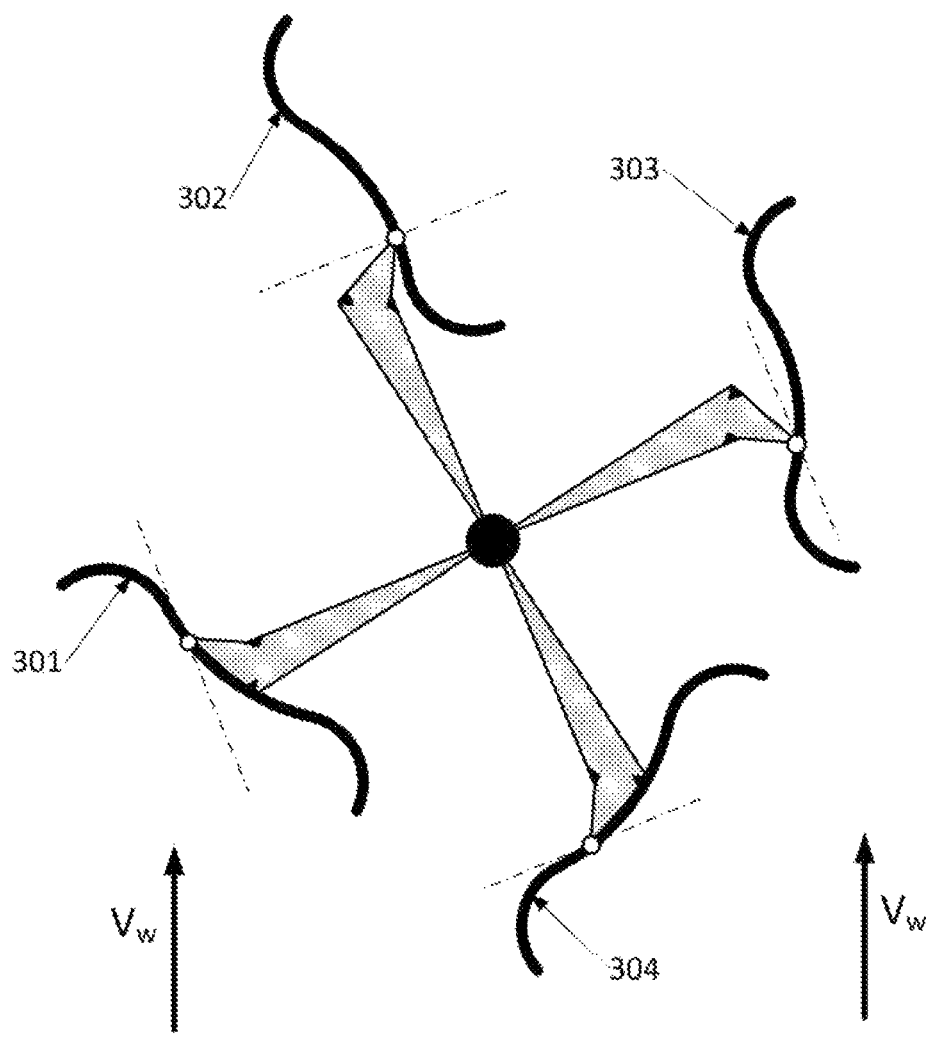
Figure 27:
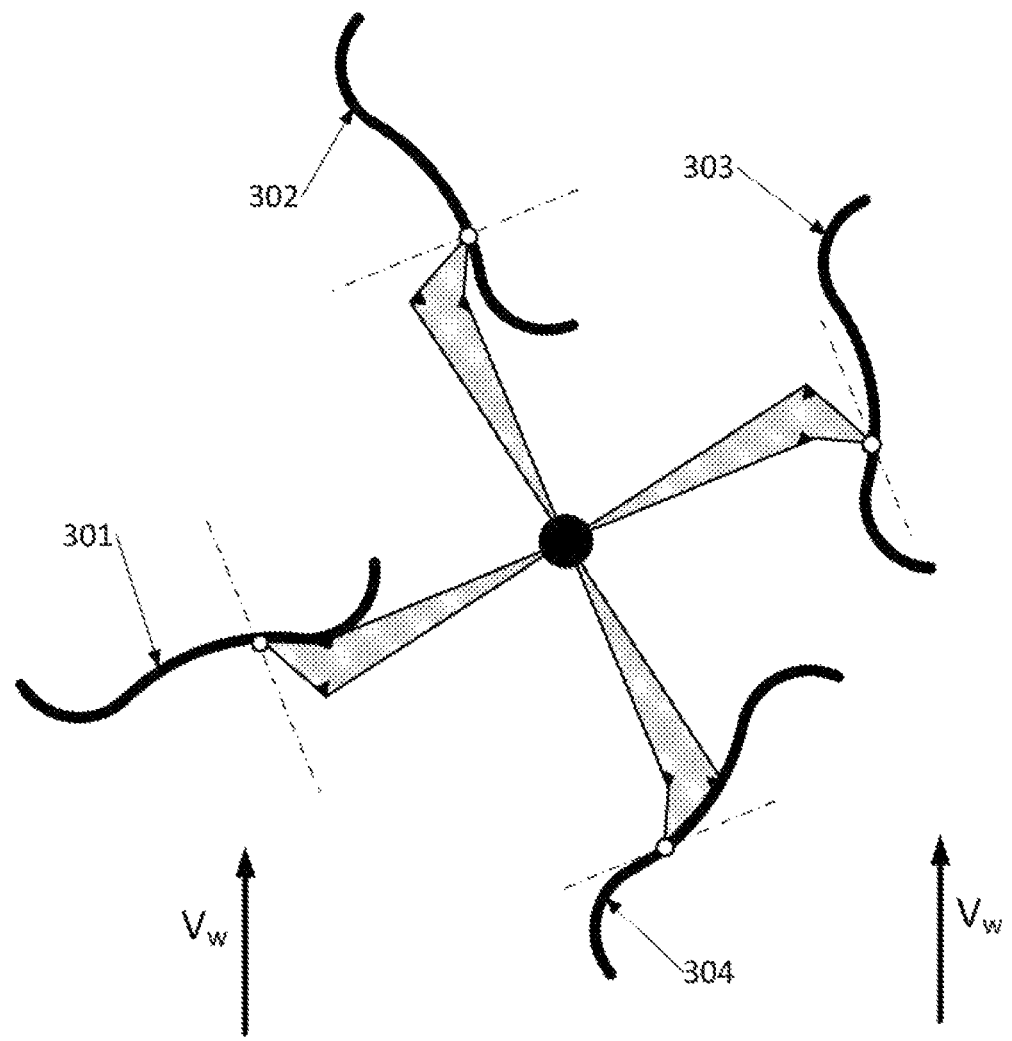
Figure 28:
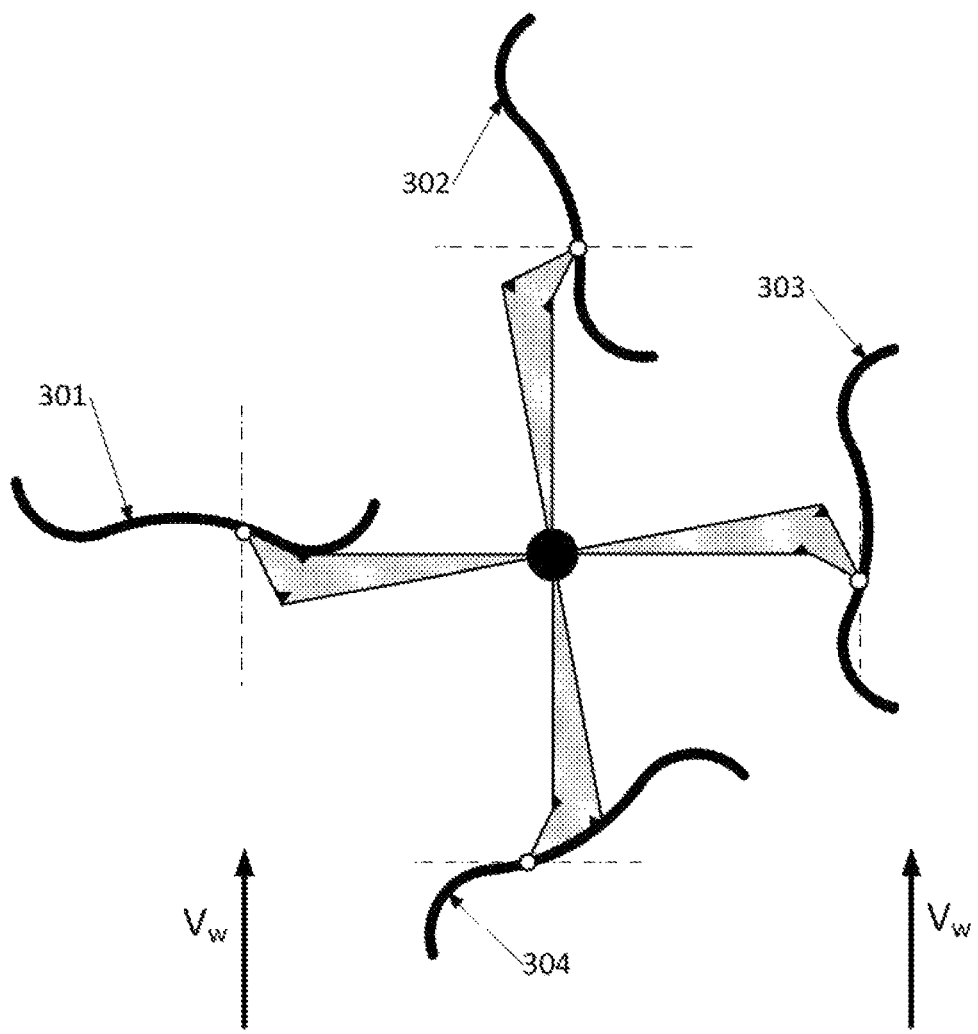
Figure 29:
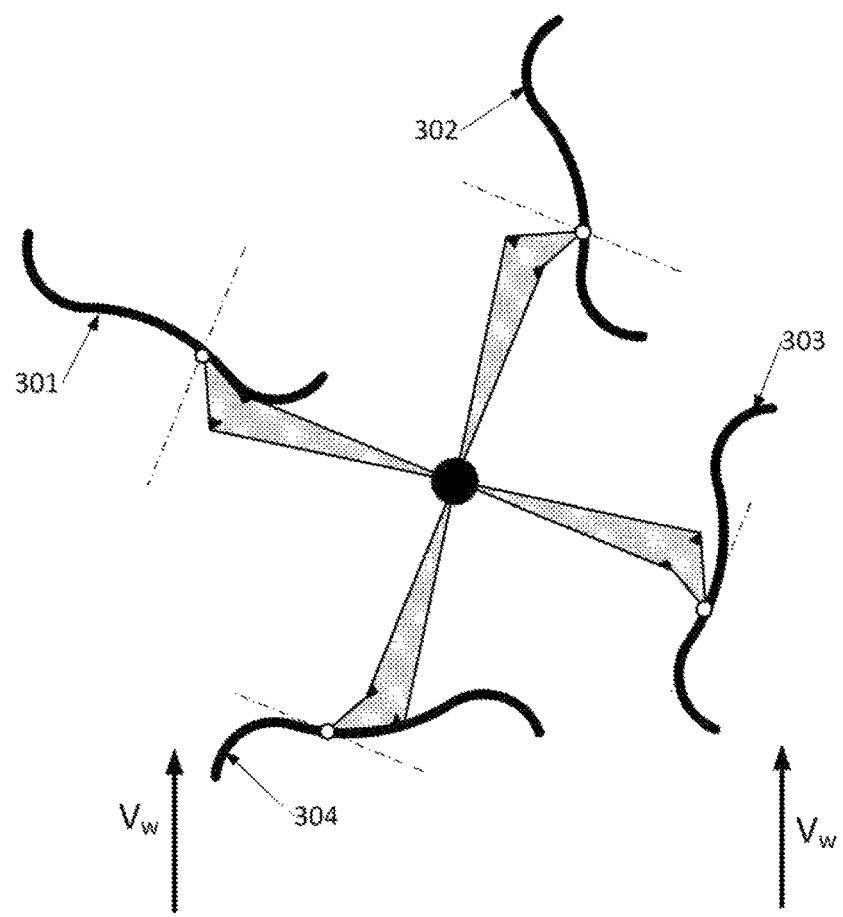

FIG. 20 schematically shows a turbine blade 30 according to a third embodiment of the invention. In this embodiment the two tabs 34a and 34b and the central portion 30a of the blade 30 are manufactured from either a single sheet of material bent into a wave-like shape or two or more rectangular pieces that are bent into curved shapes and rigidly connected together to form a single surface. With this shape, when either side of the blade is oriented at ninety degrees to the direction of the wind, the force of the wind on the blade is essentially the same. This is symbolically shown in FIG. 21. As in the first two embodiments, blade shaft 24 is attached to blade 30 not in the middle of the blade, but is located at distance "a" less than "b" from the two edges of the blade.

FIG. 22 to FIG. 29 schematically show different stages in the orientation of the blades of the third embodiment as the turbine is rotated. These figures are analogous to FIG. 1b and FIG. 3 to FIG. 9. The description of the orientations of blades 301 to 304 in FIG. 22 to FIG. 29 is the same mutatis mutandis as that for the corresponding blades in FIG. 1B and FIG. 3 to FIG. 9. Lift force in this embodiment is less effective.

In drag force efficiency range, the blades of the third embodiment of the turbine, have almost the same efficiency as the second embodiment without the extra mechanical elements and expense.

Figure 30:
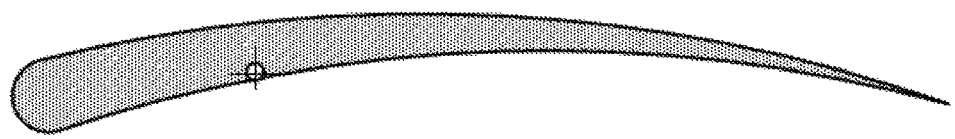
FIG. 30 and FIG. 31 schematically show cross-sectional views of a blades that are bent and shaped to have a cross-section with an aerodynamic profile.

FIG. 30 is a cross-sectional view of a blade that functions in the same way as the blade in the first embodiment described herein above. In this embodiment the blade is made of a single piece of rigid material bent and shaped to have a cross-section with an aerodynamic profile. The shapes of the edges act in the same manner as the tabs in the first embodiment.

Figure 31:
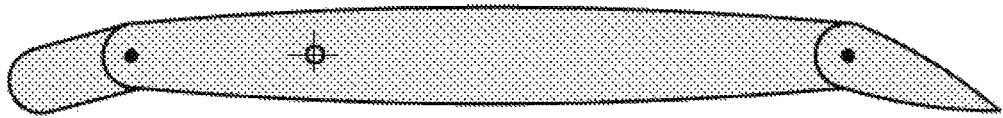

FIG. 31 is a cross-sectional view of a blade that functions in the same way as the blade in the second embodiment described herein above. In this embodiment the central section and the tabs of the blade are bent and shaped to have a cross-section with an aerodynamic profile. The central section and the tabs are three parts of one symmetric airfoil.

Although embodiments of the invention have been described by way of illustration, it will be understood that the invention may be carried out with many variations, modifications, and adaptations, without exceeding the scope of the claims.

The invention claimed is:

1. A vertical axis wind turbine comprised of the following elements:
    a base;
    a vertical shaft fixed to said base;
    at least three equally spaced horizontal arms attached to said vertical shaft;
    at least three vertical blade shafts, each blade shaft connected to one of said arms;
    at least three blades, each of said blades attached by means of bearings to one of said blade shafts; and two stoppers at the ends of each of said arms positioned to limit the range of rotation of said blades around said blade shafts;

wherein, each of said blades has a rectangular central portion and one rectangular vertical tab attached to each vertical edge of said central portion and said central section of said blade is attached to said blade shaft at distances "a" and "b" from the respective inside edge of each of said tabs, wherein a<b wherein each blade is composed of one of the following:

a) a single planar piece of stiff material bent at opposite edges to form a central section and two tabs:

b) stiff material and shaped as a non-symmetric airfoil bent on its two edges;

c) a central section and tabs made from planar pieces of stiff material and each of the tabs is rigidly connected to the central section respectively at angles β1 and β2 that remain constant as the blade rotates around the blade shaft;

d) a central section and tabs made from planar pieces of stiff material and each of the tabs is connected to the central section by means that allow them to rotate about a vertical tab axis and allow respective angles β1 and β2 between each of the tabs and the central section to constantly change as the blade rotates around the blade shaft;

e) a central section and tabs made from a single rectangular sheet of stiff material that is bent into a wave-like shape; and f) a central section and tabs made from rectangular pieces of stiff material that have been bent into a wave-like shape and each of the tabs is rigidly connected to the central section.

2. The vertical axis wind turbine of claim 1, wherein the at least three equally spaced horizontal arms are rigidly attached directly to the vertical shaft, which is attached to the base by bearings that allow said vertical shaft and said attached arms to rotate freely around the longitudinal symmetry axis of said vertical shaft.

3. The vertical axis wind turbine of claim 1, wherein the vertical shaft is rigidly attached to the base and the at least three equally spaced horizontal arms are attached to said vertical shaft by means of a hub that is adapted to freely rotate about said vertical shaft.

4. The vertical axis wind turbine of claim 3, comprising one hub to which are rigidly attached at least three equally spaced horizontal arms, said hub located between the top and the bottom of the vertical shaft.

5. The vertical axis wind turbine of claim 4, wherein the stiff material is chosen from: a metallic sheet, reinforced plastic, or a composite material.

6. The vertical axis wind turbine of claim 3, comprising two hubs to each of which are rigidly attached at least three equally spaced horizontal arms; wherein, one of said hubs is located at the top and one of said hubs is located at the bottom of the vertical shaft, wherein the top of each of the vertical blade shafts is attached to one of the arms attached to said top hub and the bottom of each of said vertical blade shafts is attached to one of the arms attached to said bottom hub.

7. The vertical axis wind turbine of claim 1, wherein each of the blades is made of a stiff material.

8. The vertical axis wind turbine of claim 1, wherein each of the tabs is connected to the central section by means that allow them to rotate about a vertical tab axis and allow respective angles β1 and β2 between each of the tabs and the central section to constantly change as the blade rotates around the blade shaft; said vertical axis wind turbine comprising links that are connected to the arms and the tabs by means of link joints that allow the link to swivel and cause said tabs to rotate about their respective tab axis as the wind causes the blade to rotate about its blade shaft.

9. The vertical axis wind turbine of claim 1, wherein each of the tabs is connected to the central section by means that allow them to rotate about a vertical tab axis and allow respective angles β1 and β2 between each of the tabs and the central section to constantly change as the blade rotates around the blade shaft and the central section and the tabs of each blade made of rigid material that is bent and shaped to have a cross-section with an aerodynamic profile.

10. The vertical axis wind turbine of claim 1, wherein the central section and the tabs are made from rectangular pieces of stiff material that have been bent into a wave-like shape, each of the tabs is rigidly connected to the central section, and the wave-like shapes of the central section and the tabs of each blade are created such that when either side of the blade is oriented at ninety degrees to the direction of the wind, the force of the wind on the blade is essentially the same.

* * * * *